US012759164B1

(12) United States Patent
Angoy et al.

(10) Patent No.: US 12,759,164 B1
(45) Date of Patent: Oct. 13, 2026

(54) ROBOTIC MOLD DETECTION AND TREATMENT SYSTEM WITH SELF-CLEANING SENSOR

(71) Applicant: UIPCO, LLC, San Antonio, TX (US)

(72) Inventors: Rebecca Scheers Angoy, Littleton, CO (US); Kelly Q. Baker, San Antonio, TX (US); Christopher Paul Blanchard, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 74 days.

(21) Appl. No.: 18/959,974

(22) Filed: Nov. 26, 2024

Related U.S. Application Data

(60) Provisional application No. 63/604,275, filed on Nov. 30, 2023.

(51) Int. Cl.
*B25J 11/00* (2006.01)
*B25J 9/16* (2006.01)
*B25J 19/00* (2006.01)
*B25J 19/02* (2006.01)

(52) U.S. Cl.
CPC ........... *B25J 11/0085* (2013.01); *B25J 9/161* (2013.01); *B25J 19/0058* (2013.01); *B25J 19/02* (2013.01)

(58) Field of Classification Search
CPC .... B25J 11/0085; B25J 9/161; B25J 19/0058; B25J 19/02
See application file for complete search history.

(56) References Cited

U.S. PATENT DOCUMENTS

| | | | | |
|---|---|---|---|---|
| 6,776,824 | B2 | 8/2004 | Wen | |
| 2005/0278888 | A1 | 12/2005 | Reindle | |
| 2008/0056933 | A1 | 3/2008 | Moore | |
| 2012/0078417 | A1* | 3/2012 | Connell, II | B25J 13/087 901/1 |
| 2017/0273534 | A1* | 9/2017 | Alpert | A47L 15/4295 |
| 2018/0197135 | A1 | 7/2018 | Moyer | |
| 2021/0030225 | A1 | 2/2021 | Broz | |
| 2021/0347048 | A1* | 11/2021 | Trevor | A47L 11/4011 |
| 2022/0095869 | A1* | 3/2022 | Zhang | A47L 11/145 |
| 2023/0165991 | A1* | 6/2023 | Kim | A61L 2/24 239/289 |
| 2023/0277990 | A1 | 9/2023 | Johnson | |
| 2024/0382634 | A1 | 11/2024 | Stager | |
| 2025/0178928 | A1 | 6/2025 | Lee | |

OTHER PUBLICATIONS

Office Action mailed Mar. 13, 2026 for U.S. Appl. No. 18/959,933.
U.S. Appl. No. 18/307,204, filed Apr. 26, 2023.

* cited by examiner

*Primary Examiner* — Nhi Q Bui
(74) *Attorney, Agent, or Firm* — Plumsea Law Group, LLC

(57) ABSTRACT

A method, system, and robot assembly for automated inspection of structures and mold remediation. The embodiments are configured to allow for the deployment of a mold remediation robot assembly into a building. The mold remediation robot assembly includes a self-cleaning system for detecting when the onboard mold sensor has accumulated excessive amounts of mold that requires cleaning. In response, a self-cleaning operation can be performed to ensure the mold sensor remains unobstructed by mold particles.

20 Claims, 22 Drawing Sheets

T1

ROBOTIC MOLD DETECTION AND TREATMENT SYSTEM WITH SELF-CLEANING SENSOR

CROSS-REFERENCE TO RELATED APPLICATION

This application claims the benefit of U.S. Provisional Patent Application Ser. No. 63/604,275 filed on Nov. 30, 2023 and titled "Robotic Mold Detection and Treatment with Self-Cleaning Sensor", the disclosure of which is incorporated by reference herein in its entirety.

TECHNICAL FIELD

The present disclosure generally relates to automated inspections and treatment of moisture-related damage, and specifically to a method and system of sensing and removing mold in the air, walls, ceilings, and floors.

BACKGROUND

Most buildings, including commercial and residential buildings, are typically exposed to the elements during the course of their life. Various forms of precipitation such as rain, sleet, snow, hail, and humidity all contribute to the deterioration of buildings over time, as well as environmental conditions such as wind, heat and cold, solar rays, shifting earth, pests, etc. A building component such as an interior wall (e.g., drywall, plywood, panels, plaster, sheetrock, etc.) that serves an integral structure of a residential home must remain protected against certain environmental elements such as rain water or heat/cold, as well as damage from plumbing damage (e.g., leaks and flooding). However, over the course of the component's installed life, exposure to such elements that can cause the component to deteriorate and begin to fail is sometimes unavoidable.

A water-damaged building can represent a substantial loss to residents, and a substantial inconvenience to home owners and other users. In many cases, one of the most challenging first steps is to determine whether moisture damage has occurred, as the signs are not always immediately obvious. The resident must then locate the exact area in which moisture has spread so that an appropriate method for repairing or removing the moisture can be determined. Consumers often engage in a trial-and-error approach until the water leak or other moisture damage such as mold is located and eliminated, and resources and time are expended in simply identifying the location of its presence with some level of accuracy. A mold treatment system and method that are capable of autonomously determining the location and extent of moisture damage—and perform mold removal operations—in a practical and cost-effective manner would therefore be beneficial.

There is a need in the art for a system and method that addresses the shortcomings discussed above.

SUMMARY

In one aspect, a mold remediation robot assembly is disclosed. The assembly can include (a) an autonomous vehicle; (b) a mold detection system installed on the autonomous vehicle, the mold detection system including: a mold sensor configured to measure mold content, the mold sensor including a sensor plate and a self-cleaning system that automatically removes mold particles from the sensor plate in response to an accumulation level of mold particles on the sensor plate exceeding a preselected threshold. In different embodiments, a mold remediation system is also installed on the autonomous vehicle, the mold remediation system including an ultraviolet (UV) light configured to kill mold particles.

In another aspect, a method for mold remediation in a structure is disclosed. The method includes a first step of receiving, by an onboard computing system of a mold remediation robot assembly, first data from a mold sensor of the mold remediation robot assembly, the first data captured while the mold remediation robot assembly was in a first area of a structure performing a mold treatment application. A second step includes determining, at the onboard computing system, a mold accumulation level for a sensor plate of the mold sensor exceeds a preselected threshold. In addition, a third step includes performing, via the mold remediation robot assembly, a self-cleaning operation that automatically removes mold particles from the sensor plate in response to determining the mold accumulation level exceeds the preselected threshold.

In another aspect, a system for mold remediation in a structure includes a processor and machine-readable media including instructions which, when executed by the processor, cause the processor to: (1) receive, by an onboard computing system of a mold remediation robot assembly, first data from a mold sensor of the mold remediation robot assembly, the first data captured while the mold remediation robot assembly was in a first area of a structure performing a mold treatment application; (2) determine, at the onboard computing system, a mold accumulation level for a sensor plate of the mold sensor exceeds a preselected threshold; and (3) perform, via the mold remediation robot assembly, a self-cleaning operation that automatically removes mold particles from the sensor plate in response to determining the mold accumulation level exceeds the preselected threshold.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1A:
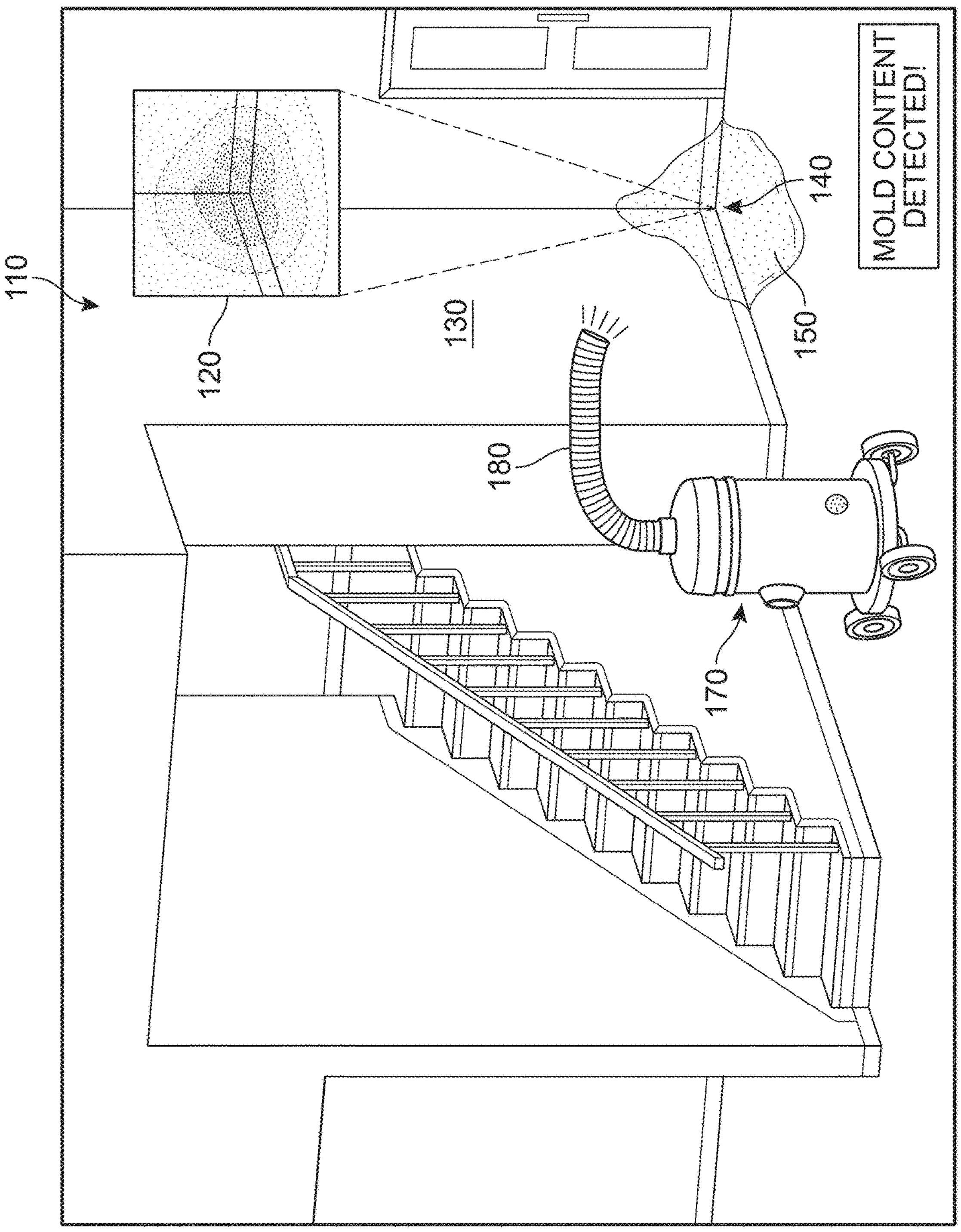
FIGS. 1A and 1B present an example in which a mold remediation robot assembly navigates from one room in a residence to another room in the residence and detects areas of high mold, according to an embodiment.

During disasters such as hurricanes, tornadoes, floods, and fires, residents of the associated disaster area are often forced to evacuate their homes. This makes performing recovery efforts for these residents difficult, as homes are damaged and remain vulnerable to the elements, and in many cases access to the buildings can be blocked or otherwise remain inaccessible for normal traffic. However, the period directly following such events is often a critical time for taking actions that can prevent long-term damage to the home. The longer the structure remains exposed to contaminants such as flood water, rain, hail, snow, or other undesirable elements, the greater the likelihood that damage from mold will be permanent or that repairs will be cost-prohibitive, and that components of the house will need to be completely replaced. In cases where insurers are responsible for a settlement, delays in the repair or cleaning of the house are typically associated with a rising payout to handle the higher level of damage. A house will benefit from damage control that can commence immediately following the disaster, both in terms of cost and overall loss.

The embodiments provide a robot-based mold treatment system that can be deployed in emergencies or other scenarios where a house or other building has been exposed to wet conditions and is vulnerable to moisture-related damage such as mold. In such scenarios, users may not be on-site, having evacuated themselves, or may be unable to initiate the mold remediation process due to lack of the necessary hardware or safety gear. Unfortunately, water damage due to events such as flooding, sewage back-up from flooding in the area, plumbing or roof leaks, damp basement or crawl spaces, overflows from sinks or bathtub, or high humidity, if not dealt with within 24-48 hours, will become a breeding ground for mildew and mold. Even worse, the impact will continue to grow until steps are taken to eliminate the source of moisture. The return of residents must often be delayed by contaminated floodwaters in the surrounding region, or water that might be electrically charged from underground or downed power lines, which further delays the critical clean-up.

In order to address these challenges and help reduce the presence of mold around a home before significant damage occurs, the proposed embodiments offer a mechanism by which autonomous or semi-autonomous unmanned vehicles can be deployed to initiate and expedite the mold removal process. The proposed embodiments allow for such vital efforts to be conducted during the window of time directly subsequent to the water exposure event even while conditions remain dangerous for human visitors. The robots include a mold remediation device ("de-molder") installed and/or integrated on the vehicle that can be used to initiate a mold inspection and treatment operation at the homes. As will be described in greater detail below, in some embodiments, the system can include articulating, movable detector hose and a mold sensor cleaning system that can individually and collectively be used to facilitate the clean-up of mold in an area.

A mold remediation robot assembly (may also be referred to by the terms "robot-based de-molder", "de-molder robot", "robot assembly", "robot", or "assembly") of the embodiments that includes the mold remediation device can be delivered to the target location without regard for safety and reduce moisture levels during the critical period after the house was exposed to water. Upon entering the home, the mold remediation device is automatically activated in response to the detection of moisture-impacted areas. In some embodiments, the robot includes a laser array to sense or detect areas of high moisture in the house and target its de-molding efforts accordingly. In another embodiment, the robot includes provisions for drilling, tapping, or otherwise piercing holes into portions of the walls in order to facilitate airflow and reduce mold growth. Some aspects of inspecting and treating mold that may be implemented by the present embodiments are described in U.S. patent application Ser. No. 18/307,204 titled "Emergency Deployment of a Drone-Based Dehumidifier" to Chavez et al., and filed Apr. 26, 2022, which is incorporated by reference herein in its entirety.

As a general matter, negative effects of moisture on building envelopes are well known. Some effects can include (a) loss of material in the affected structure due to changes in water volume when changing the physical phase and/or when chemical substances contained in water (e.g., salt) react with the affected material (e.g., plaster), (b) worsening of user's health and comfort due to the growth of mold in non-nutritive moist materials with traces of organic matter contamination, and (c) increase in energy consumption due to the lower thermal resistance of moldy materials compared to dry materials leading to a lower degree of insulation of a building. These and other negative effects can result in outcomes that cause (a) catastrophic consequences for the integrity of the building, (b) illness and discomfort to users, and (c) high levels of energy waste, resulting in both increased economic costs and pollution.

As will be described in greater detail below, in different embodiments, the systems can include a mold detection assembly that may be utilized to monitor the presence of mold (e.g., in the air and on surfaces, etc.) in a particular location, such as a home (e.g., in a room, under the sink, in the walls, near toilets, near washing machines, near dishwashers, near water heaters, among other locations), a commercial building, and/or other suitable locations. The mold detection device may include various components (e.g., a communication module, a computing device, a controller, a battery, and/or an array of sensors) installed in the robot. In one example, the device sensors can include infrared, moisture, thermal, or other imaging cameras.

For purposes of clarity, an overview of one embodiment of the proposed systems and methods is illustrated with reference to FIGS. 1A and 1B. In FIG. 1A, at a first time T1, an interior portion of a first building 110 is shown following water damage (for example, a torrential storm). As a result of the storm, parts of the building have been exposed to the exterior environment, such as a damaged corner 140 of a wall 130. Typically, in this type of scenario, the residents may have already evacuated their home. As noted earlier, the effects of moisture on the interior surfaces of the home can occur rapidly and a timely response can mean the difference between a simple remedy or a complete loss. Thus, the damage that has occurred will continue to cause deterioration of different parts of the building if no active repairs or preventative measures can be taken without human presence. Indeed, it can be appreciated that human entry on the property at this time is fraught with risk. However, as shown in FIG. 1A, the use of an unmanned demolding robot assembly 170 can initiate clean-up without a human presence.

In different embodiments, demolding robot assembly 170 can be understood to comprise a large canister or other air container configured as an autonomous vehicle. An onboard computing system can include a plurality of components, including processor, memory, sensors, controller, a communication system, a navigation system, an image processing system, rechargeable battery, a computer vision module, and a mold response system that determines when an action (such as a mold remediation treatment or self-cleaning event) should occur. In some embodiments, the vehicle may be programmable for delivery to designated destinations. In other embodiments, the vehicle may be piloted remotely to some extent to their target destinations. Memory may comprise a non-transitory computer readable medium. Instructions stored within memory may be executed by the one or more processors. In addition, each robot may include a communication system such as a radio or other provisions for communicating using one or more communication methods. In particular, communication system includes provisions for communicating with other nearby devices and/or cloud server over a network. For example, each communication system could include a Wi-Fi radio, a Bluetooth radio, other NFC components, and/or a cellular network radio. Each robot can include provisions for communicating with, and processing information from, a cloud-based server as well as other devices in the home network. In one example, a navigation system is incorporated in the onboard computing system.

In FIG. 1A, the demolding robot assembly 170 has moved into a room space that includes the wall 130. A detector hose 180 for the demolding robot assembly 170 extends from an exterior of the housing of demolding robot assembly 170. In different embodiments, the detector hose 180 is a robotic articulating arm that can move and change pose in response to control signals from the demolding robot assembly 170. The demolding robot assembly 170 can use the detector hose 180 to scan a space. In this case, when the detector hose 180 turns and faces toward wall 130, it identifies mold 150 growing in corner 140. The demolding robot assembly 170 can inspect the damage with onboard image sensors and determine the extent of the mold coverage (e.g., first sensor image 120) to help identify the density of mold and form a map of the portions that need to be treated.

Figure 1B:
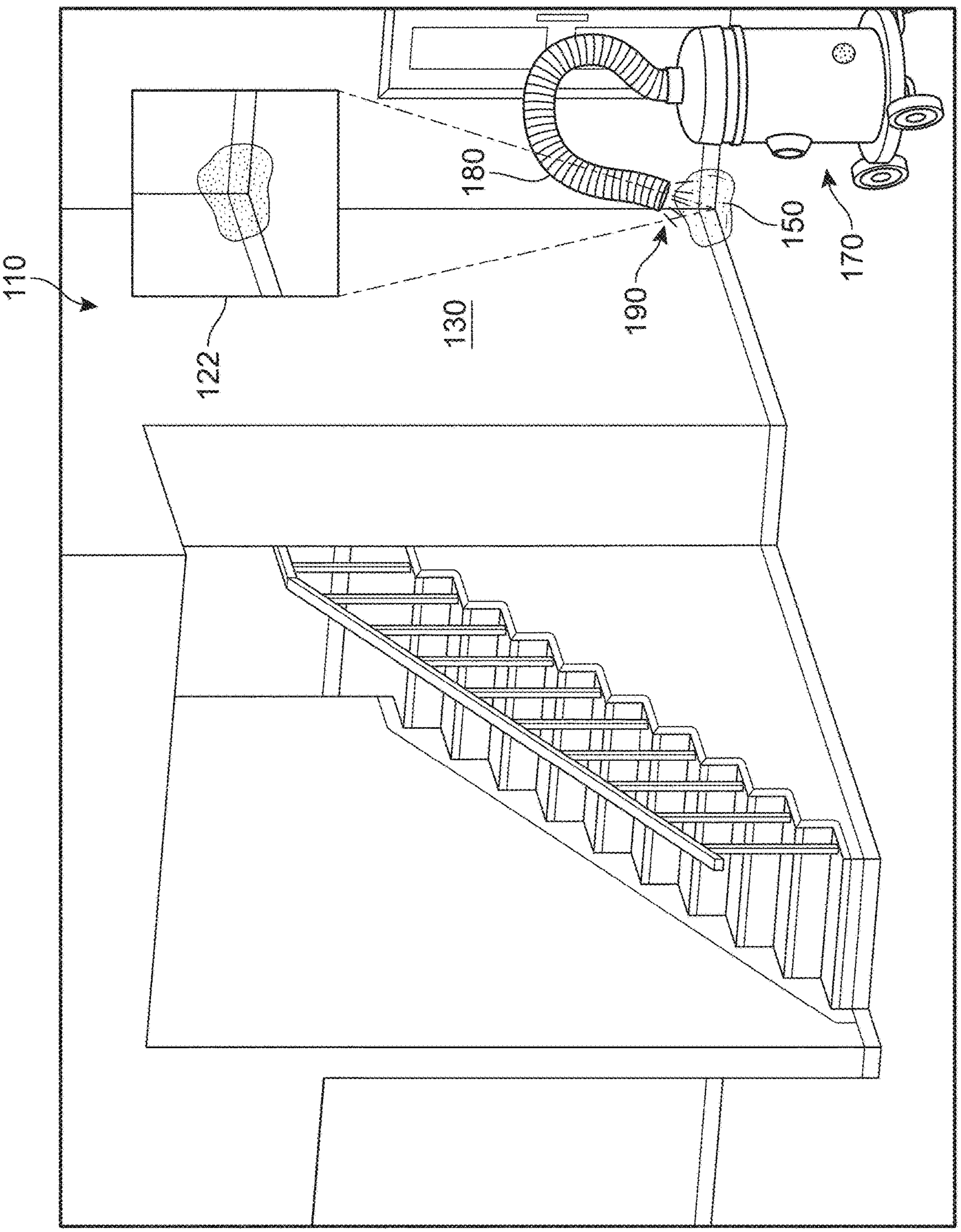

Moving to FIG. 1B, based on the mold assessment, the demolding robot assembly 170 can move closer to the mold 150 and initiate a de-molding treatment operation. In one example, the detector hose 180 can also include provisions for the removal of mold spores 190, such as an air scrubbing mechanism and/or negative air machine. In other embodiments, different apparatuses can be installed in de-molding robot assembly 170 that will be activated and directed toward the designated target areas for de-molding. At a second time T2, the mold 150 is reduced, as reflected in a second sensor image 122. Thus, this entire process can occur with little or no human interaction with the environment or the device/robot.

Figure 2:
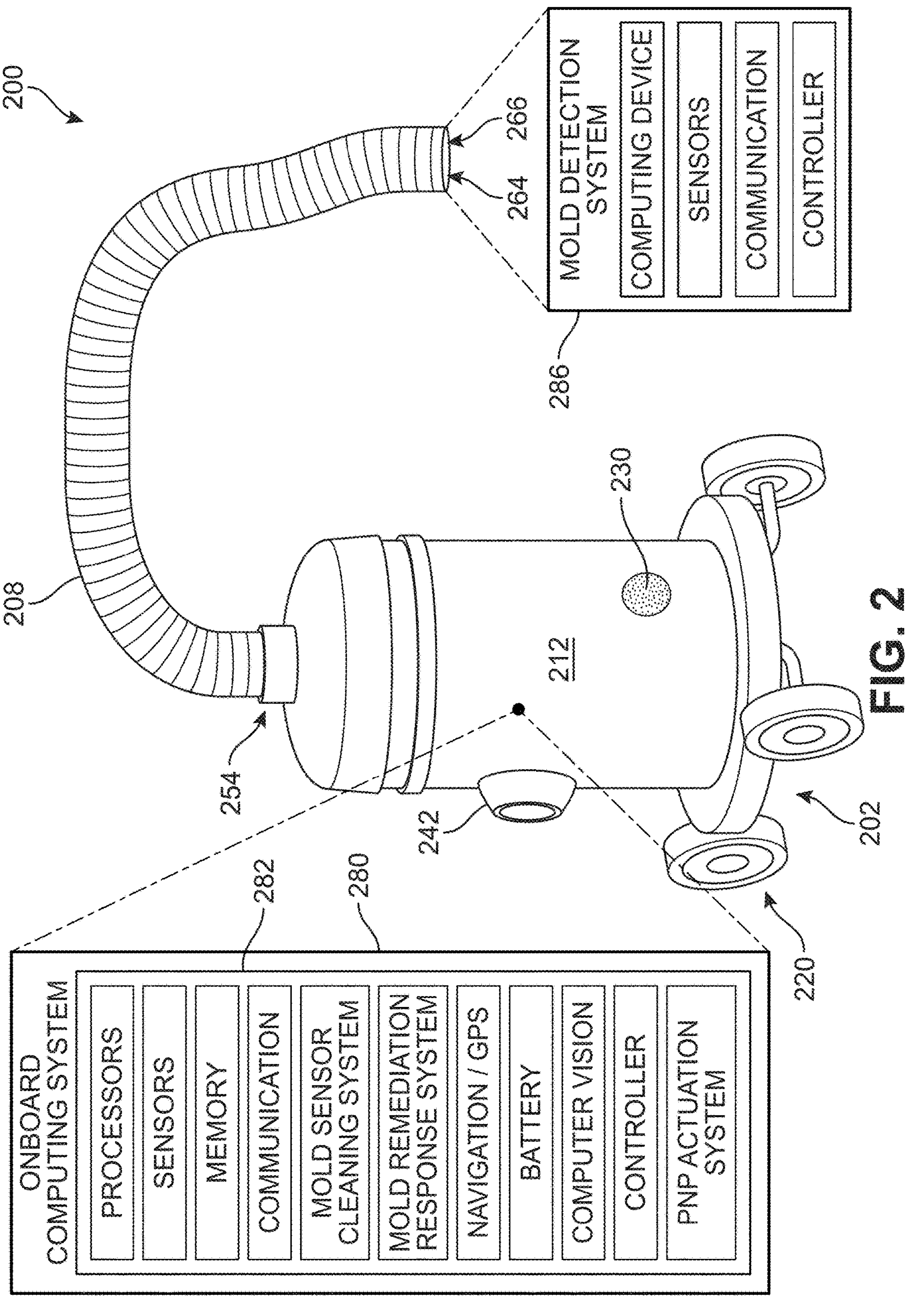
FIG. 2 is a schematic diagram of a mold remediation robot assembly, according to an embodiment.

Referring next to FIG. 2, an example of a robot demolding assembly ("assembly") 200 is presented. In different embodiments, assembly 200 will include an unmanned vehicle (UV) or self-driving vehicle or robot 202 capable of autonomous or semi-autonomous navigation on land or even sea or air, from a central robot repository or local carrier to a target destination (such as a residence, building, or other location in need of clean-up assistance). For example, the vehicle 202 can include an onboard computing system 280, actuators, motors, and a power system. The robot shown in the drawings is designed for ground travel and includes wheels 220. In other embodiments, the robot can include provisions for navigating through floodwater with one or more propellers and rudders. The vehicle 202 will typically operate in response to signals from the onboard computing system 280. The onboard computing system 280 can include a plurality of components 282, including processor, memory, sensors, controller, a communication system, a navigation system, an image processing system, rechargeable battery, and a computer vision module. Furthermore, in some embodiments, the onboard computing system 280 includes a mold remediation response system 392, a positive and negative pressures (PNP) actuation system 394 (e.g., see FIGS. 7-9C), and a mold sensor cleaning system 390 (e.g., see FIGS. 12A-16C). In some embodiments, the robots may be autonomous. That is, the robots may be programmable for delivery to designated destinations and then operate independently at that location to complete specific tasks or goals. In other embodiments, the robots may be piloted remotely to some extent to their target destinations and then operate independently at that destination.

Memory may comprise a non-transitory computer readable medium. Instructions stored within memory may be executed by the one or more processors. In addition, each robot may include a communication system such as a radio or other provisions for communicating using one or more communication methods. In particular, communication system includes provisions for communicating with other nearby devices and/or cloud server over a network. For example, each communication system could include a Wi-Fi radio, a Bluetooth radio, other NFC components, and/or a cellular network radio. Each robot can include provisions for communicating with, and processing information from, a cloud-based server as well as other devices in the home network.

In one example, a navigation system is incorporated in the onboard computing system 280. As noted above, the onboard computing system 280 can also include navigation module that can further include a GPS receiver for receiving GPS information that can be used to determine a GPS location for the vehicle. In addition, the navigation module can receive path instructions from a ground system and process and execute the instructions to direct the robot along the pre-designated path. The navigation module will work in conjunction with the computer vision module, configured to interpret characteristics of the real 2D world into metric data through the processing of 2D image planes. It should be understood that the system's computer vision module will incorporate processing techniques that allow the robot to perform tasks such as machine inspection, navigation, 2D modeling, building and surveillance, as well as interaction with the environment. The accomplishment of these applications requires the execution of several algorithms that reside on onboard computing system 280, which process 2D images and provide 2D information. Some of these algorithms perform object recognition, object tracking, pose estimation, ego-motion estimation, optical flow and scene reconstruction. The navigation module will monitor the motion of the robot one place to another processing sensor data. The robot is configured to extract essential information for its state (kinematics and dynamics-state estimation), build a model of its surroundings (mapping and obstacle detection) and even track sequential objects of interest (target tracking) to enhance the perception capabilities. Thus, by combining localization and perception capabilities, the robotic platform is enabled for guidance tasks. The platform processes information from perception and localization parts to decide its next move according to the specified task (e.g., detecting and locating moisture-rich zones). The realization of actions derived from navigation and guidance tasks is performed by the controller which manipulates the inputs to provide the desired output enabling actuators for force and torque production to control the vehicle's motion. In some embodiments, different controllers can be used to fulfill mission enabled requirements (position, velocity and acceleration control).

As a general matter, the robot's computer vision module will rely on data collected by the system's camera devices, as well as Inertial Measurement Unit (IMU) s to extract useful information onboard and feedback the necessary data, fused with measurements from inertial sensors. Different types of sensors can be employed depending on the task. Onboard ultrasonic sensors could be directly integrated in obstacle avoidance operations, while onboard laser range finders provide range measurements for obstacle detection and mapping of 2D environments. In some embodiments, visual stereo or monocular camera systems can be included in assembly 200 and are able to provide depth measurements for obstacle avoidance.

Furthermore, in different embodiments, onboard computing system 280 may also include sensors for measuring orientation, altitude, and/or acceleration. For example, sensors can include a gyroscope, an altimeter, and an accelerometer. In different embodiments, sensors may also include a camera for capturing images and other light-based data for receipt by the image processing system. Camera may comprise any kind of camera, including any kind of digital camera, as well as a camera configured to capture infrared, x-ray, ultraviolet, and visible light signals.

In some embodiments, the onboard computing system 280 further includes an image capture and processing system, also referred to simply as image processing system. Image processing system may be used to store, process, and transmit image information. Additionally, in some cases, image processing system can receive navigation other coordinate/navigation information about one or more target locations. To facilitate these tasks, image capture and processing system may include one or more processors as well as memory. Memory can store instructions for programs that facilitate storing, processing, and transmitting image information. The processed image data can be provided to navigation module to execute a path around a building as the assembly 200 approaches its final destination or assumes a path toward a mold infested area or space.

In different embodiments, the assembly 200 includes an inlet or proximal opening 254 that allows for fluid communication between an attached actuatable hose device ("hose") 208 and a moisture/mold vacuum/pump device ("vacuum") 212. In different embodiments, the hose 208 can include moisture/mold detection system 286 including a plurality of components similar to those described with respect to onboard computing system 280 above, such as but not limited to a computing device, sensors, communication module, and controller module. In different embodiments, air and other particles will be sucked into hose 208 via a distal opening 266, passing through sensors 266 embedded along or otherwise secured to an interior surface of the hose 208. The moisture/mold detection system 286 can monitor and evaluate the particles passing through the hose 208 and determine whether there is a high likelihood of mold being present in the localized space from which the air was pulled. Further details regarding the hose 208 and its actuation will be provided with reference to FIGS. 7, 8, 9A, 9B, and 9C below.

In some embodiments, the hose 208 and vacuum 212 components are configured to communicate with one another and individually and/or collectively determine whether a de-molding operation event should be initiated. In one example, assembly 200 can include an onboard communication system for communication with a ground or central communication system as well as between components of the assembly itself. Various communication components installed in the two devices, such as an antenna, enable information to be transmitted between the systems via a network or signal processing. The type of communication components used in each communication system can be selected according to the type of communication channel used. In some cases, a cellular network could be used so that each communication system includes a cellular radio or other component that enables cellular communication. Using a cellular network may enable information to be exchanged while assembly 200 is traveling in areas where Wi-Fi or other networks might be unavailable. In other cases, networks could comprise any kind of local area network and/or wide area network. In some cases, network may be a Wi-Fi network, Bluetooth®, or an NFC network. In some embodiments, the ground system and robot are connected by network. In different embodiments, one or more components of assembly 200 could be disposed within a single computing device and wired to communicate directly with one another.

In different embodiments, sensors 266, in conjunction with the mold remediation response system 292 for onboard computing system 280, can also be configured to perform and apply Non-Destructive Testing (NDT) techniques. According to the ISO standard definitions, a technique is classified as NDT if it is an analysis technique used to evaluate the properties of a material, component, or system without causing damage. Then, an NDT technique is a specific way of using an NDT method, and an NDT method is a discipline that applies a physical principle in NDT. Sensors of the embodiments described herein are configured to detect, monitor, and/or measure, among others, acoustic emission, electromagnetic testing, gamma- and X-radiology, leak testing, liquid penetrant testing, magnetic particle testing, neutron radiology and gauging, ultrasonic testing, etc. In this way, the intrusive nature of the destructive techniques and the alterations they cause in the integrity of the structure are avoided with NDT techniques, in addition to gaining in objectivity and speed in results generation.

For purposes of this application, the assembly 200 can be understood to carry one or more sensors that are configured to apply NDT techniques for the detection and characterization of moisture severity in buildings, both superficial and internal. As some non-limiting examples, either or both of the vacuum 212 and the hose 208 of assembly 200 can includes (1) sensors that employ electrical tomography in the spatial analysis of moisture in porous building materials (such as bricks and cement) of various thicknesses, (2) sensors that use gamma-rays and X-rays to determine moisture diffusivity and estimate mold content, (2) sensors including dielectric and microwave meters to analyze moisture and likely mold content, (4) sensors that use laser scanning, involving a procedure to automatically show where moisture appears in a building and assess moisture saturation and movement in building materials, respectively to estimate mold content, (5) sensors that apply InfraRed Thermography (IRT) and electrical resistance measurement for in situ assessment of superficial moisture and estimate mold content, (6) sensors that use Ground-Penetrating Radar (GPR) for internal water detection and estimate mold content, (7) sensors using the near-infrared (NIR) spectrum via a non-contact, light-reflection type of moisture sensor that is based on a water molecule's light-absorbing characteristics the near-infrared (NIR) spectrum, and/or other sensors that can collect data relevant to the detection of moisture and estimate mold content. Thus, mold tracking/detection can employ a wide range of sensors to accurately identify fluid content levels and the spread of the moisture and spores across different materials and surfaces. In some embodiments, the mold detection system 286 can also include a model that can predict the path of mold growth in order to recommend a preemptive treatment of areas that are likely to be impacted if the mold ingress is not addressed.

In some embodiments, the described sensors and mold remediation system 292 can be disposed in part in the housing associated with the vacuum 212. In some embodiments, sensors are disposed along an exterior surface of the housing. In another example, sensors are anchored or embedded on a surface of wheels 252. In one example, sensors include electrodes, and spores cause a circuit to close across the electrodes. The closing of the circuit is then detectible by a mold detector device.

In different embodiments, once mold has been detected, the hose 208 communicates its findings to the mold remediation response system 292, which can initiate a mold treatment session/operation. In some embodiments, the mold removal can involve mold remediation equipment incorporated in the assembly 200. For example, once mold is detected and its location identified, the robot can move near the infested zone and target its onboard mold remediation equipment to that specific area, including but not limited to (a) air scrubbers for removing mold spores from the air via the hose 208 and into the cannister storage of vacuum 212; (b) negative air machines to prevent mold spores that are airborne from leaving the containment area; (c) dehumidification via hose 208 to remove excess moisture from the air; (d) application/spraying of different types of mold disinfectant products to kill mold of different strains via hose 208 or a sprayer 242 incorporated into the vacuum housing. In some embodiments, an ultraviolet (UV) light or laser 230 can be applied to mold-infested area to eradicate the mold spores, which can be coupled with other mold remediation operations described herein to target 100% removal of mold spores. In some other embodiments, another UV light or laser can be incorporated into the distal end of the hose to more directly aim and target the mold with UV radiation.

Referring now to FIGS. 3-6, 10, and 11, a sequence of drawings illustrates an example of the operation of a demolding robot assembly ("assembly") 300 for detection of mold and excess moisture. In this example, the assembly 300 can be understood to have arrived at a house 310, represented here in a top-down layout view.

For purposes of background, it can be appreciated that in different embodiments, the assembly 300 is deployed or dispatched from a central robot repository. For example, the repository can be managed by a mold abatement service, insurer, or other entity that can deliver de-molding devices to buildings impacted by, for example, a water-related disaster, particularly locations where people have evacuated their homes. The service can determine when a disaster is pending, or is occurring, and automatically prepares and dispatches the robots to a designated location to perform mold inspections and mold remediation. In different embodiments, such a service can includes a computing system. Computing system may comprise a server, a cluster of servers, or any suitable configuration of computing resources including one or more processors and memory. Memory may comprise a non-transitory computer readable medium. Instructions stored within memory may be executed by the one or more processors. Computing system may also include a navigation system that may be used for one or more purposes. For example, a navigation system may be used to look up addresses. Navigation system may also be used to acquire directions to one or more addresses. Navigation system may also be used to convert geographic locations provided in one format (for example, a set of GPS coordinates) to other location formats (such as a street address) for identification of target locations for the robot deployment.

Furthermore, the service can be in communication with a robot repository where the robot assemblies described herein may be stored, maintained, and managed between deployments. In different embodiments, service may communicate with various other systems over one or more networks. Examples of networks that may be used to facilitate communication between different systems include, but are not limited to: Wi-Fi networks, cellular networks, local area networks (LANs), wide area networks (WANs), personal area networks (PANs), as well as any other suitable networks.

Furthermore, the service may communicate with one or more disaster information providers. As used herein, the term "disaster information provider" refers to any entity that may transmit information about pending or ongoing disasters. As an example, the Emergency Alert System (EAS) is a federal system used in the United States to provide emergency notifications, including emergency weather alerts for specific geographic areas. In other embodiments, disaster information providers could include any other organization (private or public) configured to deliver information about pending or ongoing disasters or emergencies. Alerts can be provided over any communication mode, including short messaging service (SMS) based texts, emails, or other suitable communication modes. Service may also communicate with a Geographic Information System (GIS) provider, for example to retrieve maps and other related geographic information from GIS provider. In some embodiments, service may also communicate with weather and traffic providers and receive real-time or near real-time information about weather and traffic in specific geographic locations. In some cases, real-time traffic information may include information about road closures in an area. In one embodiment, service communicates with residents through one or more devices. As an example, a resident device owned by a resident in a particular geographic region may run an application for communicating information between service and a resident. Resident device could include computing resources such as processors, memory, and a navigation system for detecting a current GPS location. Such devices may comprise mobile phones, tablets, smart watches or other mobile devices.

In different embodiments, affirmative data and reports regarding the presence of floodwater are beneficial to determining which buildings may require mold and moisture abatement in a given geographic area. Data and reports that positively indicate flooding are definitive, whereas the data and reports indicative of evacuations and absence of persons in the area can be inconclusive. In some embodiments, computer readable medium may include instructions for determining that a user/building (target destination) within the geographic region has been impacted by flooding based the information received. In addition, in some embodiments, information from various pre-existing networks may be utilized to determine the status of geographic regions following a disaster. For example, networks such as traffic lights, utilities info, road closures, service providers (cable, internet, etc.), and other sources can be considered. Also, information from Internet of Things sensors can be reviewed. This information can be used to determine disaster response strategies. Information from vehicle diagnostics and reporting systems can also be used.

Service can also include a controller that may comprise various computing and communications hardware, such as servers, integrated circuits, displays, etc. Further, controller may include a device processor and a non-transitory computer readable medium including instructions executable by device processor to perform the processes discussed herein. As a specific non-limiting example, service may receive Internet of Things information by a house that has been impacted by flood water. In some embodiments, the house may be equipped with one or more moisture sensors configured to detect flooding. The service may be configured to receive data from such sensors. Accordingly, in some embodiments, the information indicative of the status of moisture levels for which computer readable medium includes instructions to receive includes information regarding operating status of Internet of Things devices in the geographic region.

In some embodiments, the information indicative of the status of moisture for which the computer readable medium includes instructions to receive includes information regarding emergency telephone calls (e.g., 911 calls). Emergency call records may include reports of floodwater in the caller's home or in buildings nearby. The service, or another third-party system, may analyze the information received regarding possible flooding, and may make determinations regarding the conditions in the geographic region from which the information is received. The service may be configured to send information regarding the status of water levels to inform organizations and residents of the situation. For, example, in some embodiments, computer readable medium may include instructions for sending information regarding the status of flooding conditions to a plurality of users/consumers of the system. Another way in which the determined conditions may be communicated to others is via the preparation and distribution of a map showing the localities in which water levels have been measured as over a threshold.

In some embodiments, once the service determines a location has experienced a flood event, a triggering event can be understood to have occurred. In response, the service will identify one or more target locations. This information, along with a control signal, can then be automatically transmitted to a robot repository nearest to the identified location. Any suitable communication platform and/or protocol may be utilized for communication between the controller and the robots. The robots may be manually controlled or autonomously controlled. In some embodiments, a global positioning system (GPS) navigation system may be utilized to facilitate the delivery of the robot assembly. For purposes of this application, a triggering event refers to an event or sequence of events that matches a pre-selected condition. In this example, such an event will cause a signal to be transmitted from the service to one or more robot systems for purposes of providing emergency mold abatement assistance.

Figure 3:
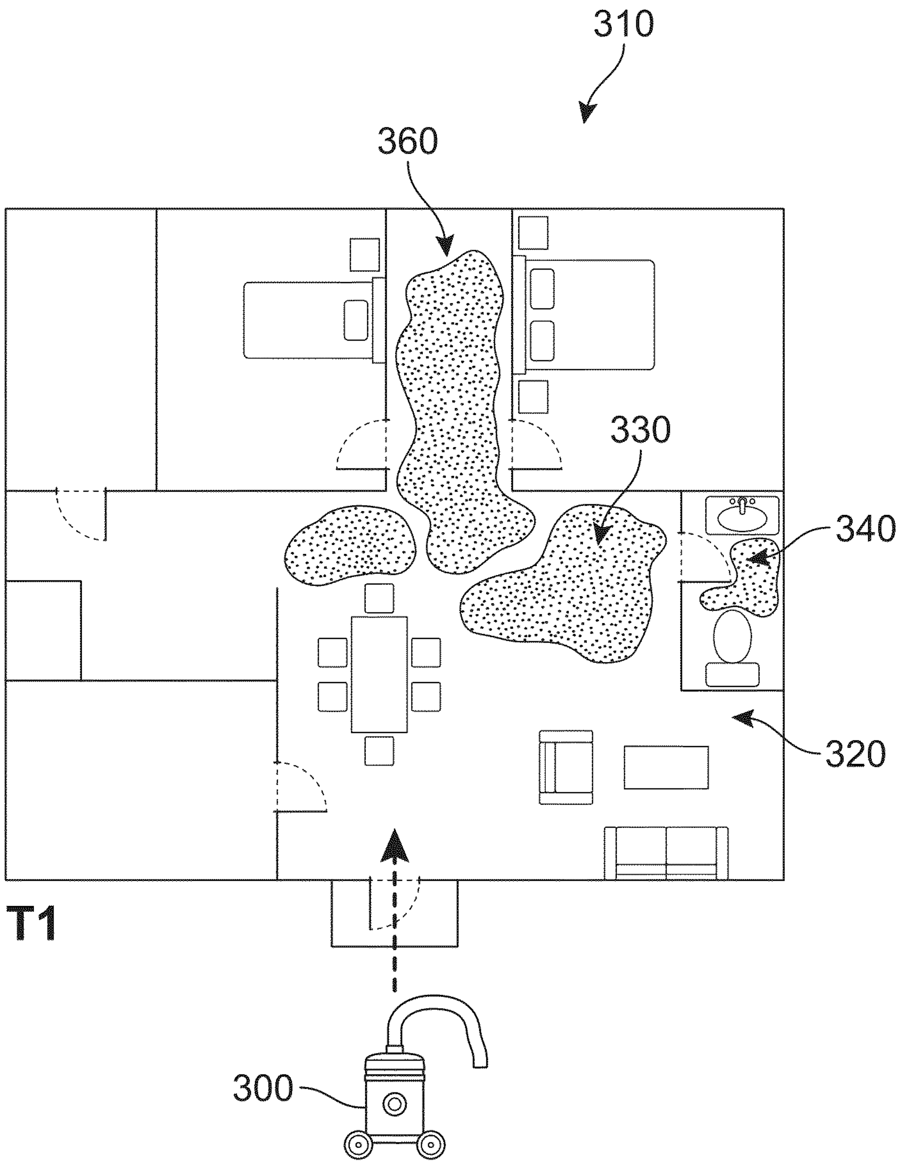
FIGS. 3, 4, 5, and 6 are schematic views of a floor plan of a residence and the progress of the mold remediation robot assembly through the residence as it performs cycles of mold detection and removal, according to an embodiment.

Upon arriving at the target location (here, house 310), the assembly 300 can, using components of its onboard computing system, determine an entry point to the interior of the building. This may involve actual force being applied to a door to break open and allow ingress. In FIG. 3, the assembly 300 is shown entering an interior 320 of house 310 at a first time T1, where house 310 includes area of mold-related damage and growth in different portions, such as in a living/dining room 330, hallway 360, and bathroom 340.

Figure 4:
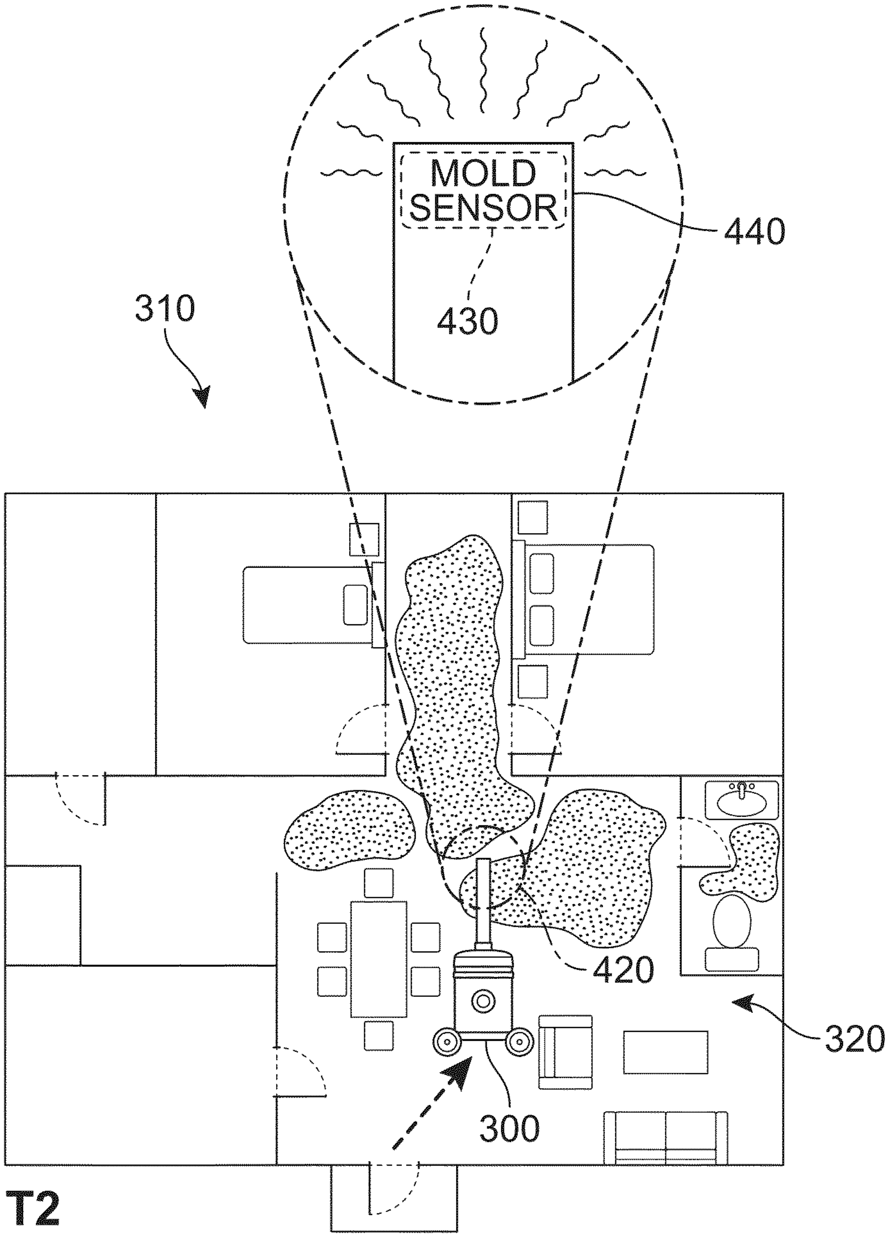
Figure 5:
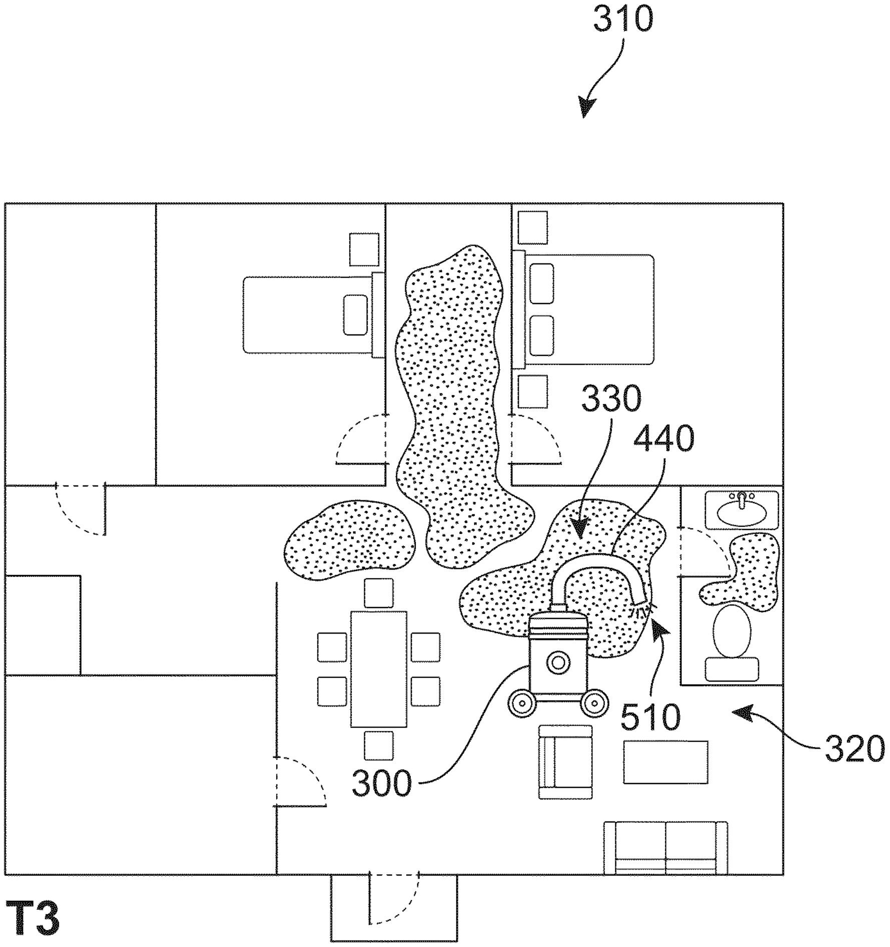
Figure 6:
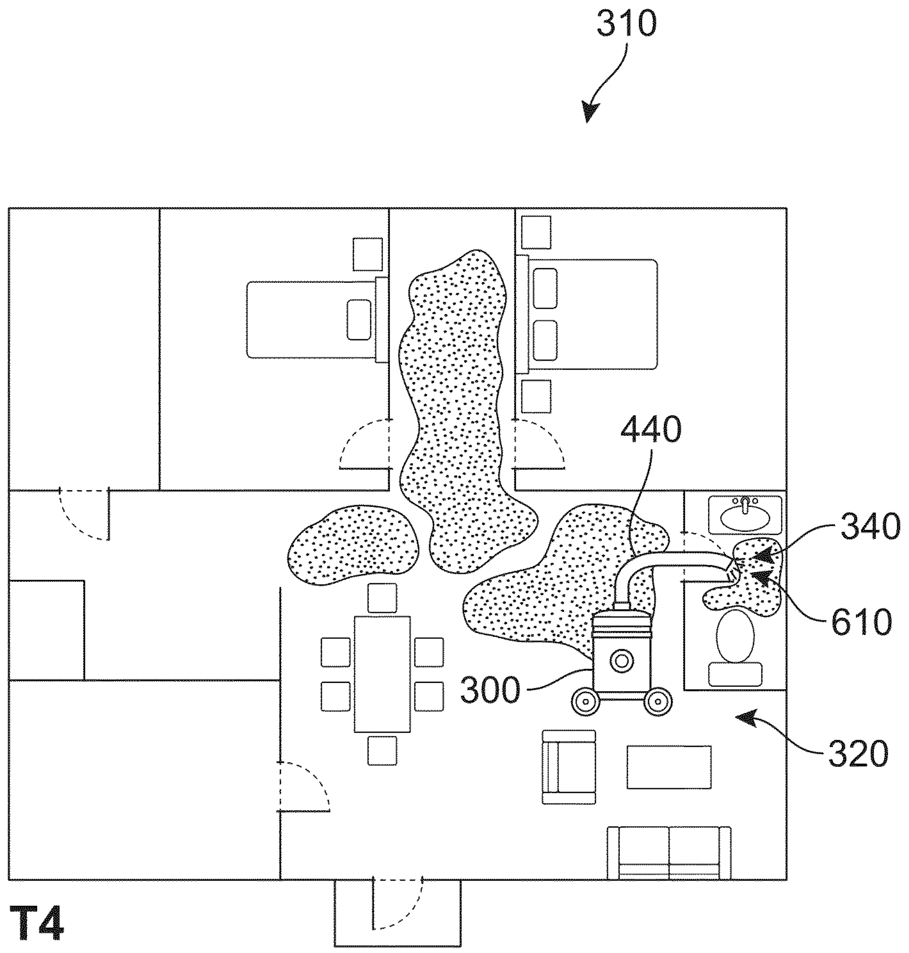
Figure 7:
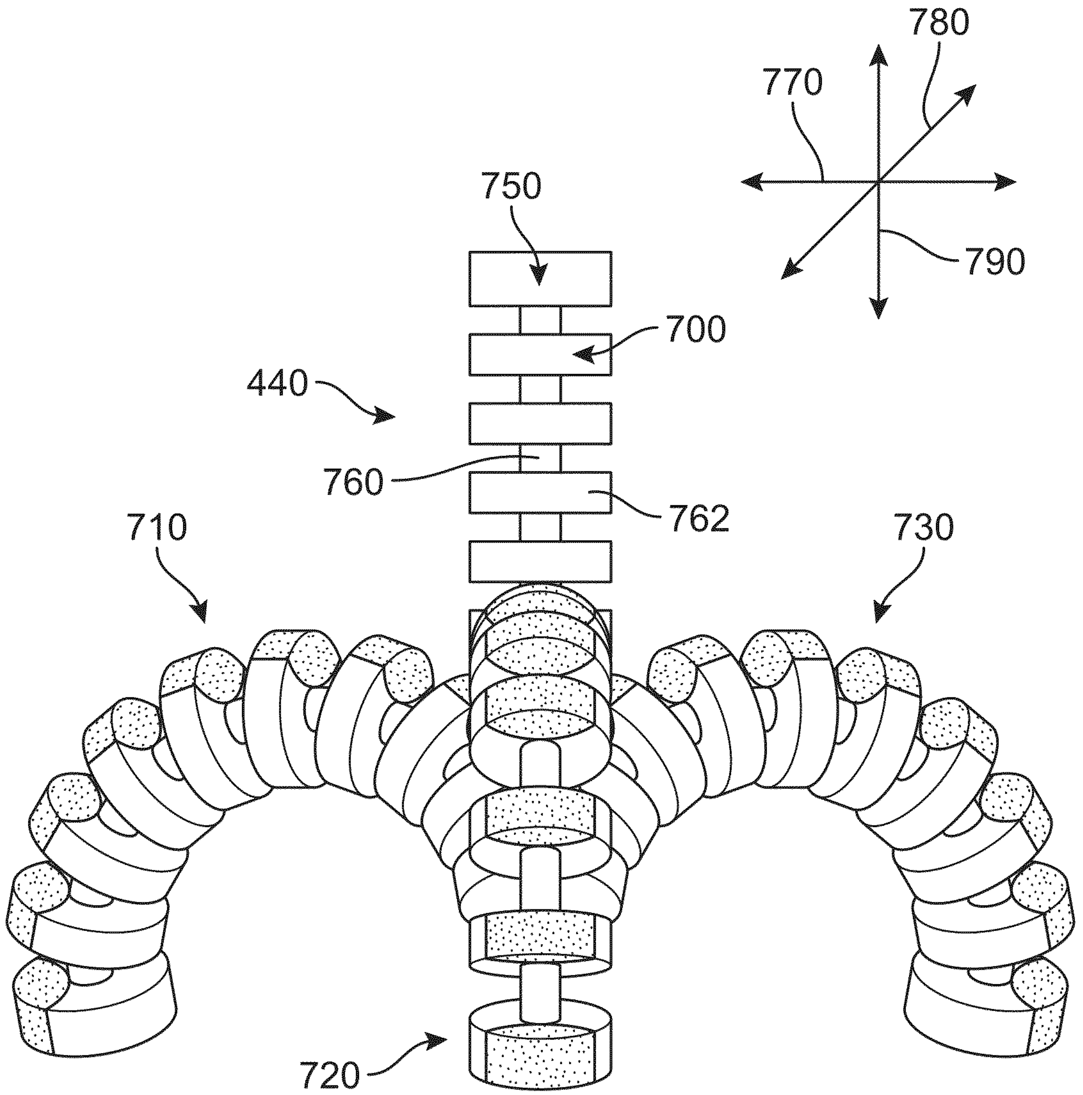
FIGS. 7 and 8 depict one example of a pneumatic actuation system for an articulating hose, according to an embodiment.

Moving next to FIG. 4, at a second time T2, the assembly 300 has traversed a path 410 from the entrance to a central point and initiated a mold inspection cycle 420. In some embodiments, the assembly 300 can perform an air conditions test by articulation of its hose 440 to an upright or vertical pose and passing air through the hose 440. The content of the air can be evaluated by a mold sensor device 430. In some embodiments, the assembly 300 can continue to move in a pattern (i.e., zig-zag, rows, etc.) to monitor the air conditions of the entire space comprising interior 320 that it can access. As shown in FIG. 5, at a third time T3, upon detection of moisture/mold content levels exceeding a preselected threshold in some specific zone of the interior 320, the assembly 300 can initiate a mold remediation session directed to a target portion where mold was detected. In this case, assembly 300 causes the hose 440 to orient and bend until its distal opening is facing the mold infested section, and performing a first mold remediation operation 510 (e.g., negative air pressure, application of disinfectant, etc.) in the living/dining room 330. Once this treatment is completed, the assembly can continue to move through the space to determine whether and where any additional treatments should occur. For example, in FIG. 6, at a fourth time T4, the assembly 300 has caused the hose 440 to articulate through the doorway leading to bathroom 340 in order to detect and treat the mold growth found there via a second mold remediation operation 610.

For purposes of clarity, FIGS. 7-9C present some additional details regarding the operation of the articulating hose 440. As noted earlier, in different embodiments, the hose 440 comprises an articulating, movable detector hose. In one example, the hose 440 can be 3-10 feet long, and can be moved autonomously by the robot (robot assembly). The distal end of the hose 440 includes an air inlet and the proximal end of the hose is connected to the canister of the vacuum device. In one configuration, the hose can extend vertically upwards from the canister, straight into the air, as shown in FIG. 4. In this position, the hose can be used to gather ambient air from the room. If mold is detected, the robot can move the end of the hose to the source of the mold to obtain further detailed data about the infestation and/or to begin a treatment application to remove the mold.

In different embodiments, the hose 440 includes individually articulating segments. A first example is presented in FIG. 7, where each articulating segment includes three fluid pockets that are spaced apart evenly from one another (and are arranged radially at approximately the same distance with respect to a center of the segment) can be pressurized or evacuated. In this case, a body of the hose 440 can be seen to comprise a central tube 760 that is surrounded at intervals by a plurality of articulating segments 762. Air can be passed through a cavity 750 formed within the central tube 760 when searching for the presence of mold. In an initial configuration 700, the hose 440 is erect and standing straight "up" relative to a vertical axis 790. However, as different 'pockets' that are formed in the segment are pressurized or depressurized, the orientation and pose of the hose 440 can alter, with some examples shown in a first configuration 710, a second configuration 720, and a third configuration 730, where each pose allows for the hose body to move in a different direction relative to the vertical axis 790, a horizontal axis 770, and a lateral axis 780. In other words, by creating a pressure difference between the pockets, that particular segment of hose will bend towards the pocket that is depressurized and away from the pocket that is pressurized. By successively bending each segment, the robot can control the location of the opening at the distal end of the hose.

Figure 8:
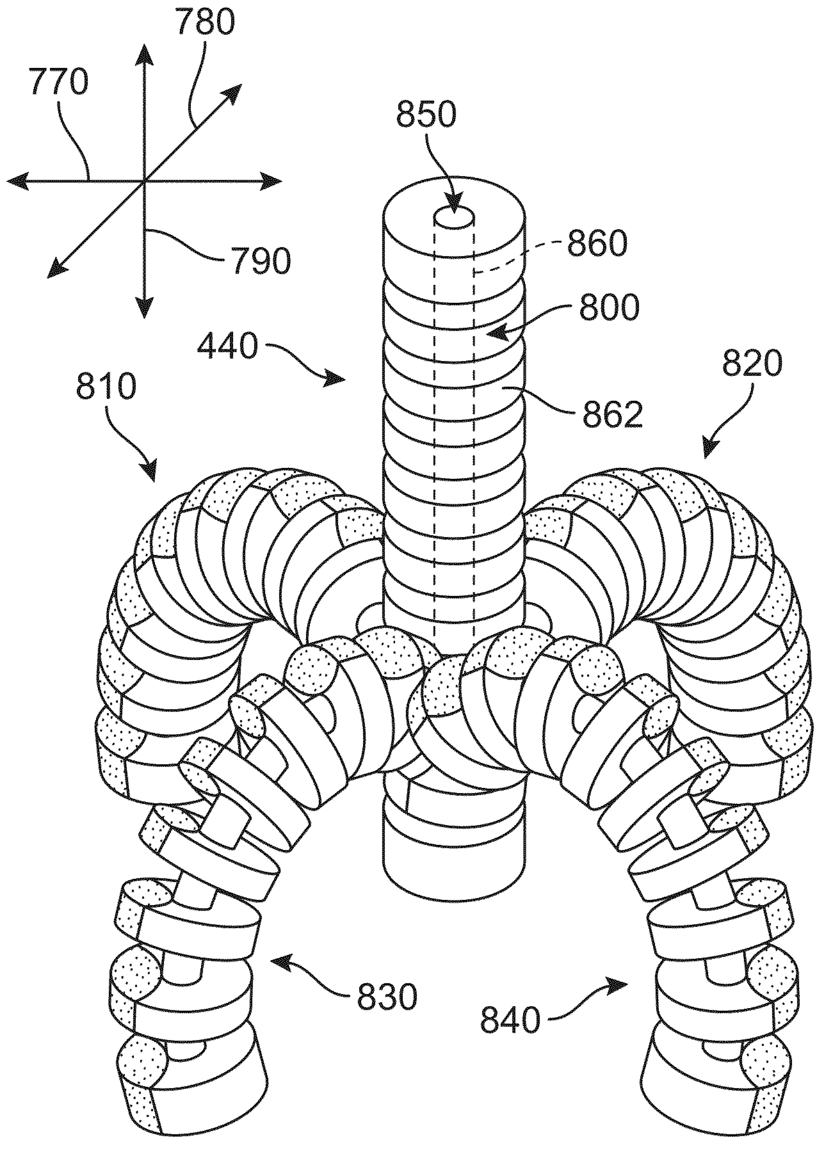

In FIG. 8, an alternate second example is shown where each articulating segment includes four fluid pockets that are spaced apart evenly from one another (and are arranged radially at approximately the same distance with respect to a center of the segment) can be pressurized or evacuated. In this case, a body of the hose 440 can be seen to comprise a central tube 860 that is surrounded at intervals by a plurality of articulating segments 762. Air can be passed through a cavity 850 formed within the central tube 760 when searching for the presence of mold. In an initial configuration 800, the hose 440 is erect and standing straight "up" relative to a vertical axis 790. However, as different 'pockets' are pressurized or depressurized, the orientation and pose of the hose 440 can alter, with some examples shown in a first configuration 810, a second configuration 820, a third configuration 830, and a fourth configuration 840, where each pose allows for the hose body to move in a different direction relative to the vertical axis 790, a horizontal axis 770, and a lateral axis 780, with greater degrees of freedom in this example due to the additional fluid pocket. In other words, by creating a pressure difference between the pockets, that particular segment of hose will bend towards the pocket that is depressurized and away from the pocket that is pressurized. By successively bending each segment, the robot can control the location of the opening at the distal end of the hose and direct its 'arm' to a specific target.

Thus, in different embodiments, a soft bending actuator combining PNP chambers into a single actuating structure where the force of both actuators is combined to produce large bending forces can be employed, managed by the onboard PNP actuation system (see FIG. 2). The positive pressure actuator can be a pouch motor located between the free ends of the rigid walls of the negative sub-actuator and its inflation causes a contractile force that pulls the nearby walls toward one another that results in a bending motion.

In some other embodiments, the proposed embodiments can employ fluidic elastomer actuators (FEAs), which generally consist of a polymeric matrix with cavities that expand upon pressurization and whose expansion causes an asymmetric deformation of the actuator which results in a bending motion. This is generally done by having a strain differential across the thickness of the actuator causing the longitudinal expansion of the actuator to produce a bending deformation. This anisotropic expansion can be induced into single material actuators by using walls of different thicknesses or by using asymmetric wall shapes. In other embodiment, thin films or textiles instead of rubbers can be employed that permit the fabrication of very lightweight actuators without necessarily lowering their performance in comparison with polymer-based actuators. Pouch motors with rigid constraints between pouches can also be used to produce bending actuators.

In some embodiments, the PNP actuator can include a continuous structure containing separate compartments (fluid chambers or pockets) of pneumatic actuators, where the pressurization of one and/or the vacuuming of the other causes the actuator to bend. The simultaneous pressurization and vacuuming of the respective actuators cause the structure to produce a larger bending force over a certain bending range than simply actuating either. As this actuator contains three or four different actuators, its actuation properties will depend on the characteristics of the actuators used and their respective actuation pressures.

Figure 9A:
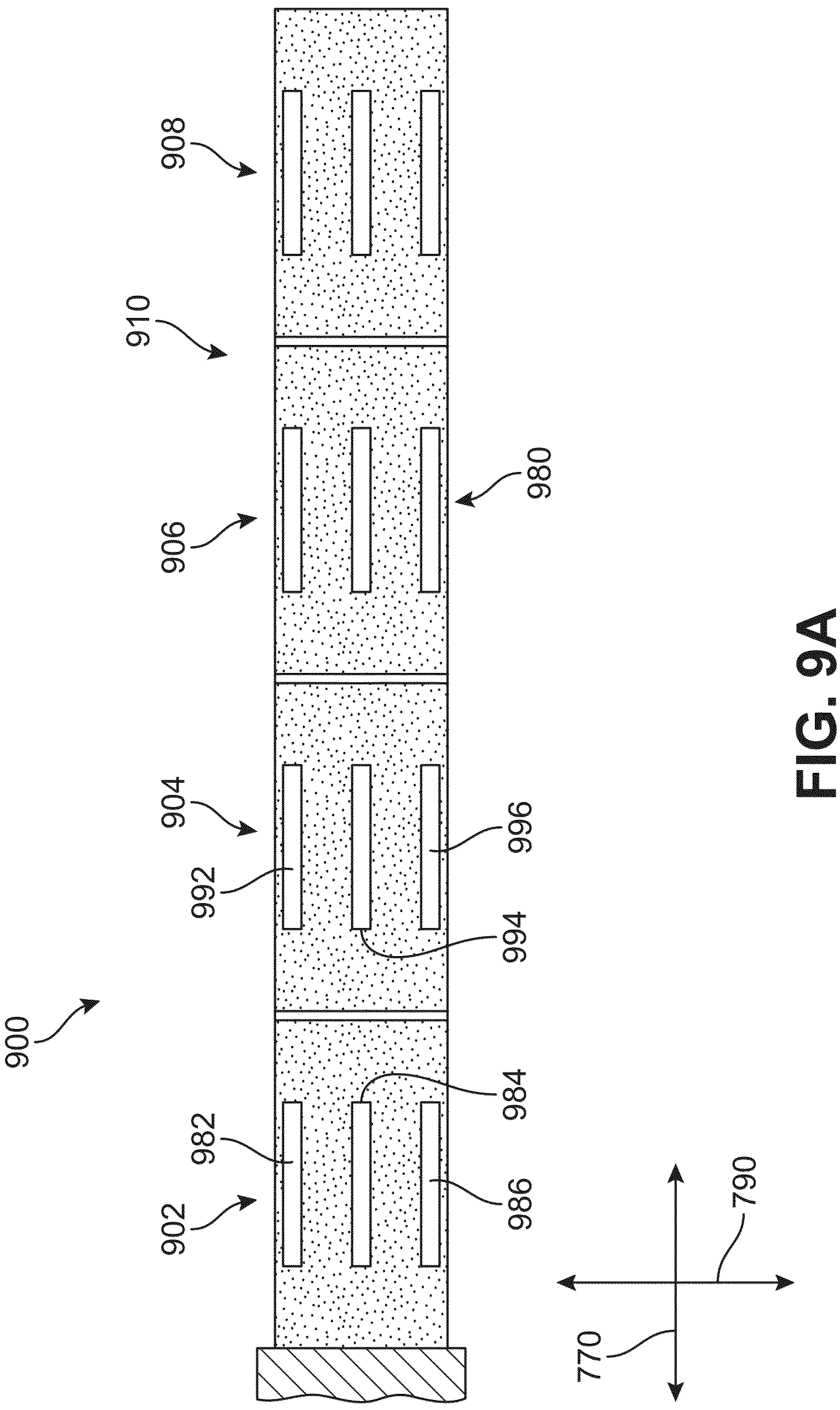
FIGS. 9A, 9B, and 9C depict a second example of a pneumatic actuation system for an articulating hose, according to an embodiment.
Figure 9B:
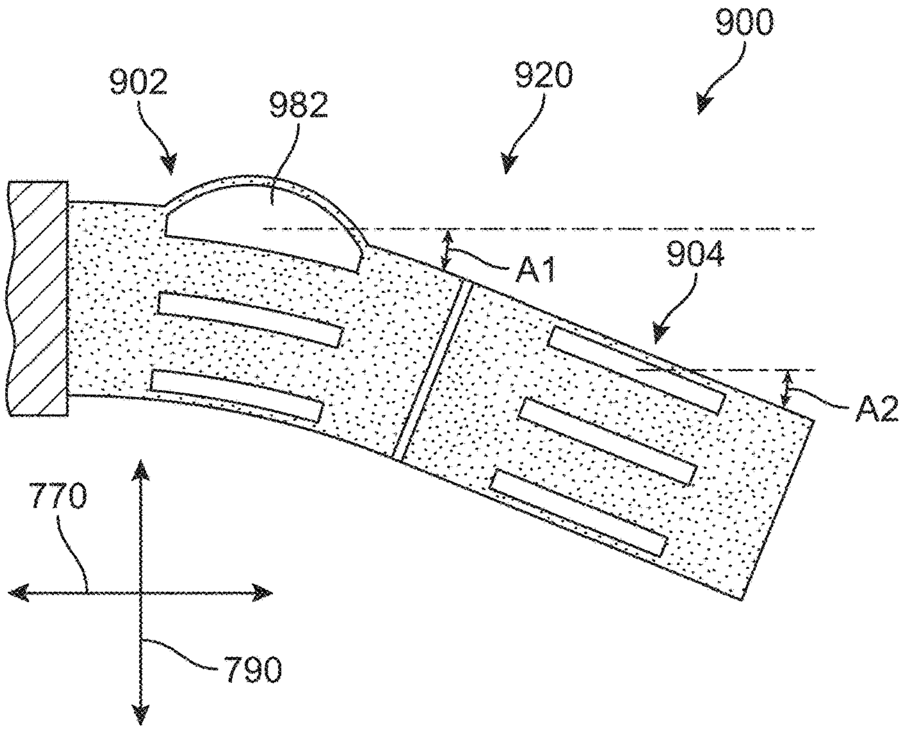
Figure 9C:
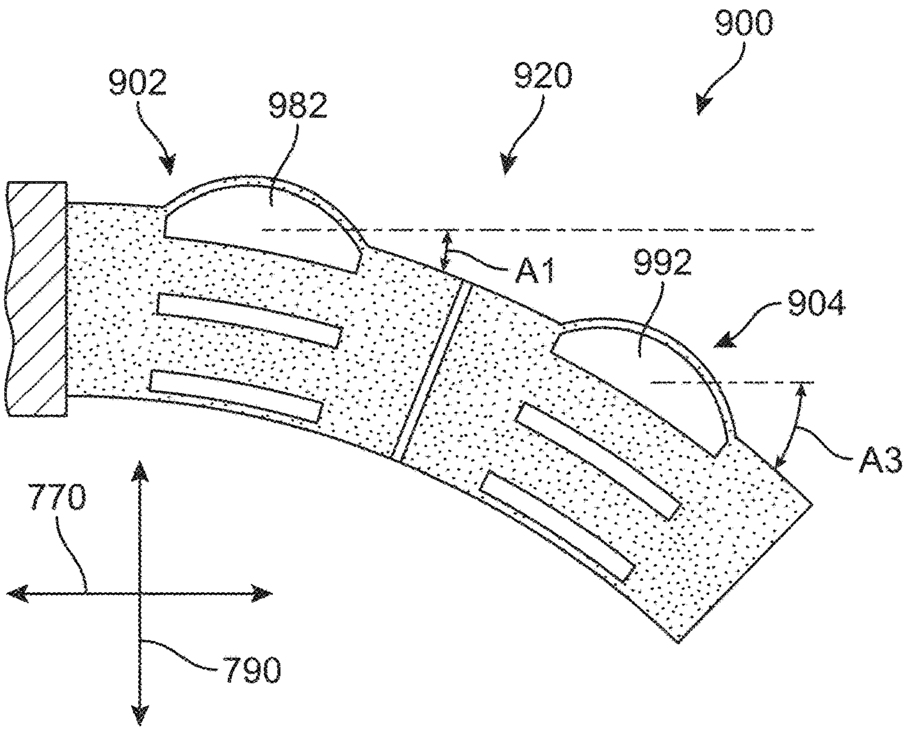

An alternate mechanism by which the articulation process can be implemented is presented by reference to FIGS. 9A, 9B, and 9C. In this sequence, a portion 910 of the hose is shown in isolation. The portion 910 includes only four segments (first segment 902, second segment 904, third segment 906, and fourth segment 908) for purposes of clarity. Within each segment are multiple chambers 980 (i.e., three or four) that extend over most of the length of their respective segment. For example, first segment 902 includes at least a first chamber 982, a second chamber 984, and a third chamber 986, and second segment 904 includes a fourth chamber 992, a fifth chamber 994, and a sixth chamber 996. In a first stage shown in FIG. 9A, the portion 910 is substantially straight, or aligned with horizontal axis 770, in a first pose 910. Each segment and each individual chamber extending within each segment is similarly aligned with the horizontal axis 770. In a second stage illustrated in FIG. 9B, pressure is increased in the first chamber 982 a 'bubble' can form that causes a downward bending of the first segment 902 at an angle A1 relative to the horizontal axis 770, transitioning the portion 900 into a second pose 920. In other words, the bending can be concave along the pressurized side, and convex along the depressurized side. This further causes the adjoining segments to reorient or tilt downward by an angle A2 relative to the horizontal axis 770. In a third stage shown in FIG. 9C, the fourth chamber 992 of the second segment 904 has also been pressurized, causing the portion 900 to bend further downward into a third pose 930. More specifically, while first segment 902 is still bent by angle A1 relative to the horizontal axis 770, the second segment 904 is bent downward by angle A3 relative to the horizontal axis 770 that is larger than A1. Thus, as different air pressures are channeled into different chambers, the hose can be finely articulated into different poses that allows for the robotic system to accurately target areas of mold.

Figure 10:
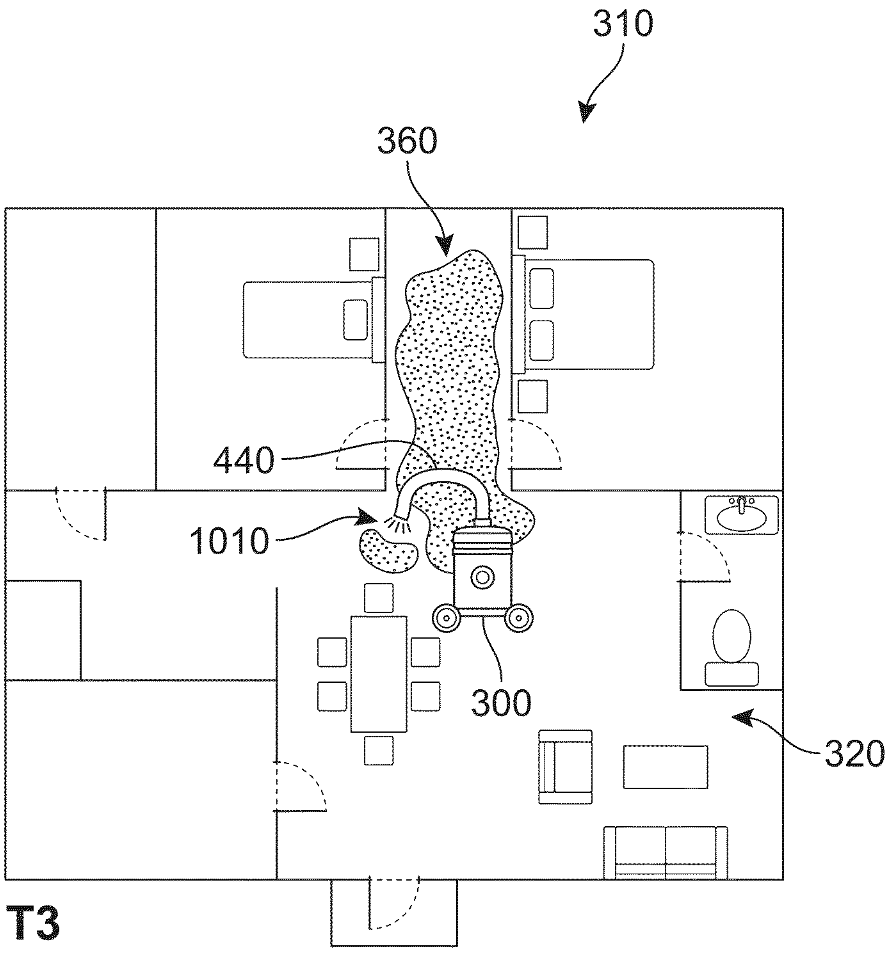
FIGS. 10 and 11 continue the sequence of FIGS. 3-6 in which the mold remediation robot assembly moves through the residence as it performs cycles of mold detection and removal using its articulating hose, according to an embodiment.
Figure 11:
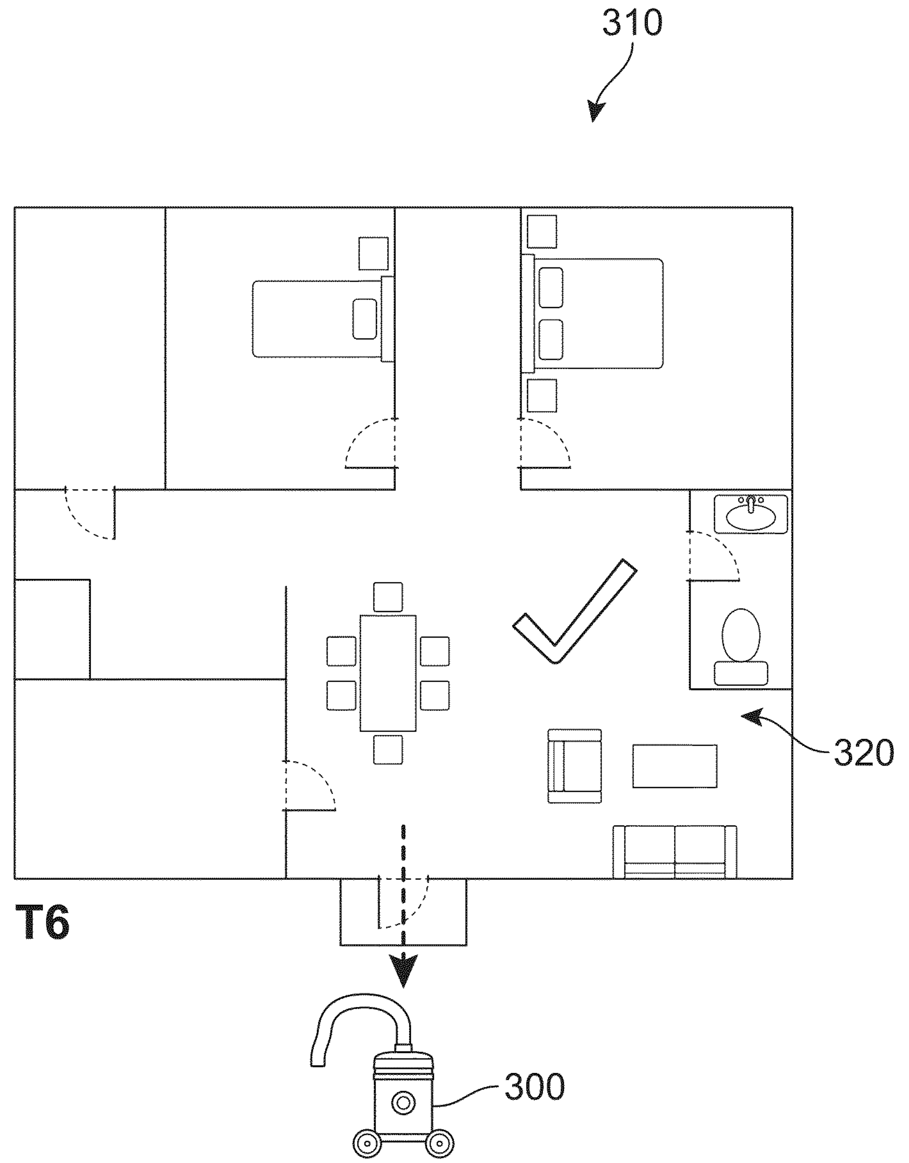

Returning to the sequence depicting mold remediation performed by the assembly 300, FIG. 10 shows the assembly moving to a new location in the house 310 closer to the hallway 360 at a fifth time T5. In response to detection of additional areas of mold, the mold remediation system sends a control signal to the PNP actuation system, which then generates a pressurization signal for modulating the articulation and pose of the hose 440 to perform another cleaning cycle, or a third mold remediation operation 1010. The assembly 300 can be understood to continue to explore and monitor and treat the interior 320 of the house 310 for mold until a sixth time T6 shown in FIG. 11, when mold remediation is successfully completed, and the assembly 300 automatically initiates a departure operation in response to determining no further moldy areas remain and/or the mold that remains is inaccessible to the robot's remediation protocols, and/or the mold that remains has not responded to the various treatment paradigms and has been tagged for follow-up.

It can be appreciated that the effectiveness of the proposed systems can be heavily dependent on the performance and accuracy of the mold detection system provided. It therefore becomes essential that the operation of the mold sensor is maintained with a high degree of care. Traditional robot maintenance is offered by manual (human) hands, which can take place when the robot assembly returns to the repository or other "home base". However, as the assembly moves through a building and seeks out mold particles, over time, the mold sensor will invariably accumulate mold particles. This accumulation can inhibit an accurate performance of the mold sensor, and this can occur mid-operation while the assembly is still working in the building toward mold reduction. Rather than require manual intervention, or that the assembly return to home base and then dispatch a repeat visit to the same location, in some embodiments, the proposed systems include a self-cleaning sensor mechanism. This mechanism can prevent excessive mold build-up on the sensor plate by an automated periodic removal of mold from the sensor.

Figure 12A:
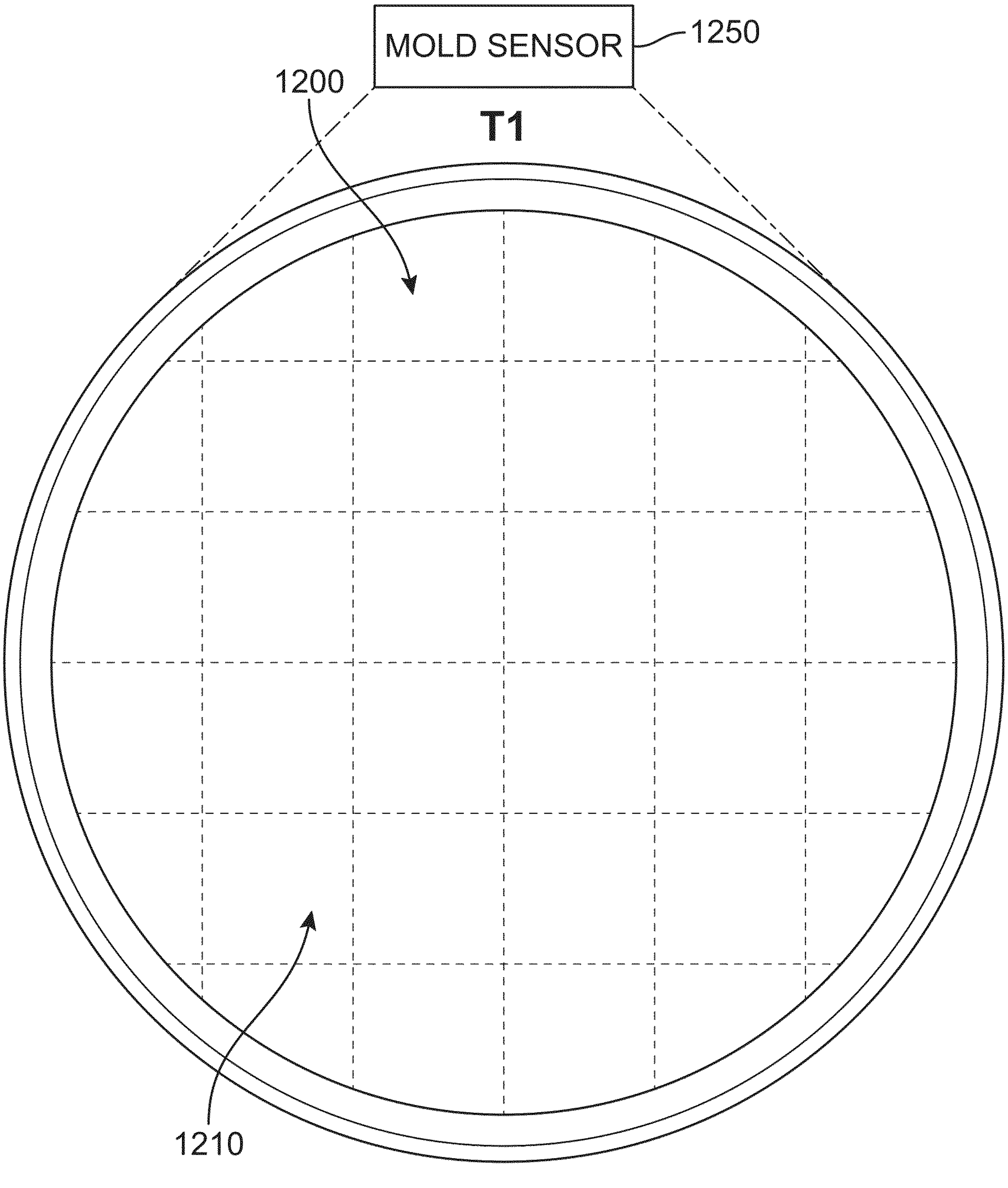
FIGS. 12A, 12B, and 12C are an illustration of mold particles accumulating on a sensor plate, according to an embodiment.
Figure 12B:
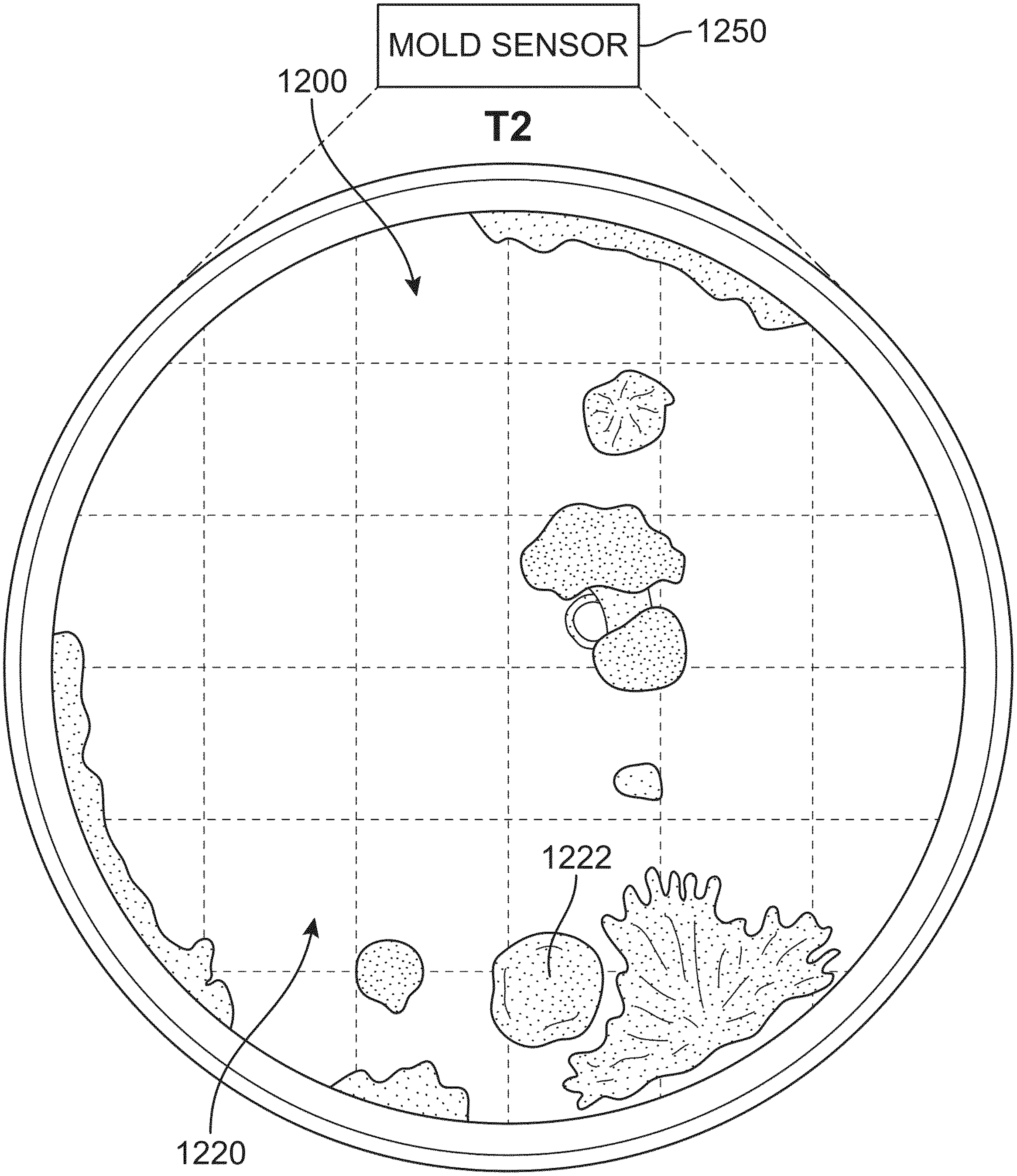
Figure 12C:
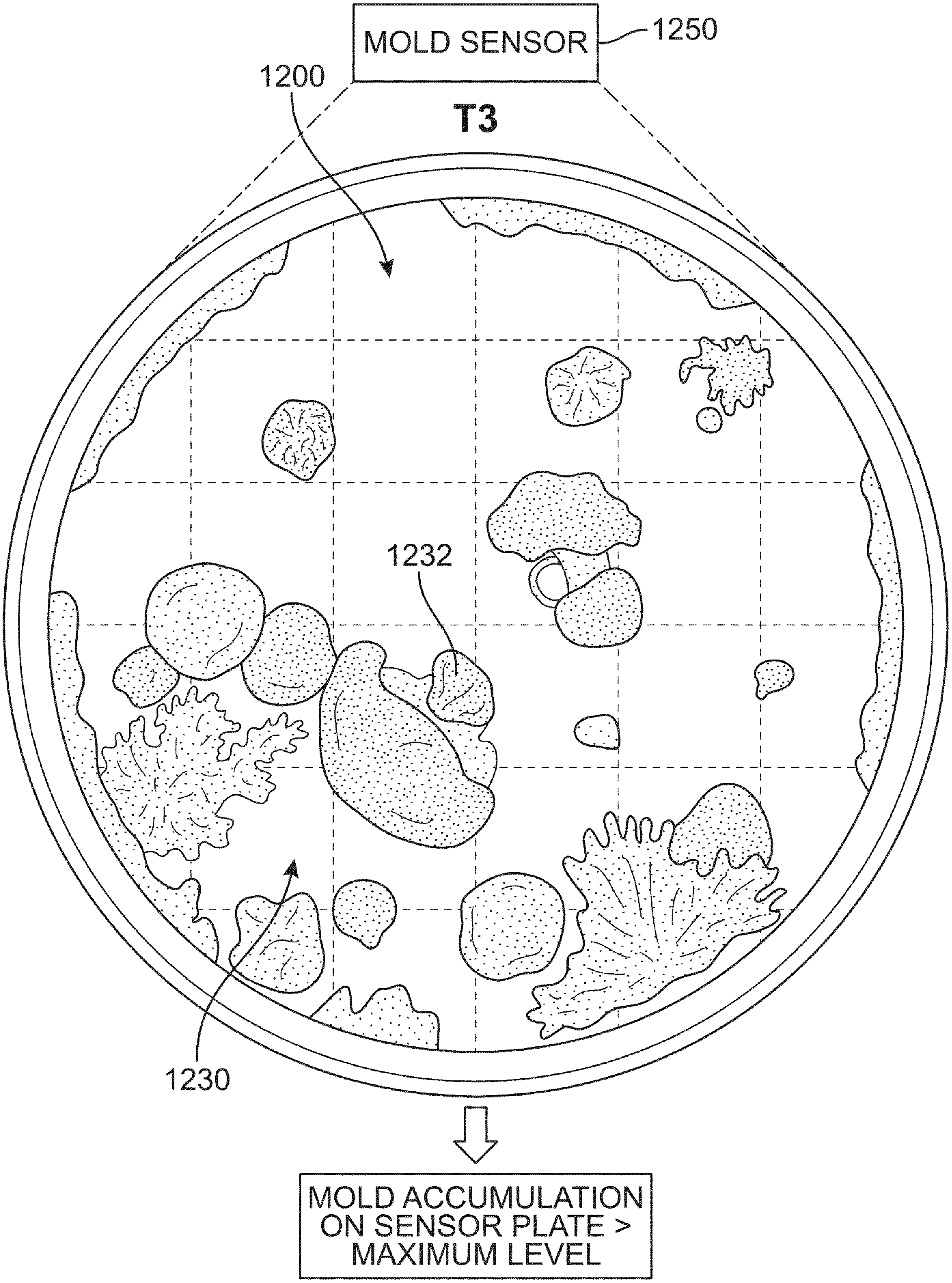

For example, referring to FIGS. 12A-12C, a mold sensor plate 1200 for a mold sensor 1250 that may be included as equipment for the onboard mold detection system is depicted. At a first time T1 shown in FIG. 12A, the assembly has just entered the building (e.g., see FIG. 3), and the sensor plate 1200 is at a zero or near-zero mold accumulation 1210. In other words, the sensor plate 1200 is clear and clean and ready to detect with a high sensitivity the presence of any mold particles in the building. At a second time T2 shown in FIG. 12B, the assembly can be understood to have traversed some areas that were inundated with mold particles 1222 and performed a few mold detection cycles (e.g., see FIG. 5), resulting in a first level of mold accumulation 1220 on the sensor plate 1200 that is greater than that of FIG. 12A. At a third time T3 depicted in FIG. 12C, the assembly has continued to move through the building and performed several mold detection cycles (e.g., see FIG. 10). The sensor plate 1200 is now at a higher, second level of mold accumulation 1230 with significant mold particle coverage 1232 that exceeds a pre-set maximum acceptable level 1290.

In some embodiments, the determination by the onboard computing system that the mold accumulation has exceeded the maximum acceptable level 1290 can trigger an automated self-cleaning event to prevent the loss of sensitivity and accuracy of the mold sensor 1250. This response is represented by the schematic depiction of the system in FIG. 13, where a mold monitoring app 1320 has been downloaded on a computing device (mobile phone) 1310, which allows the mobile phone 1310 to send/receive data and updates to/from a selected paired robot assembly, such as assembly 300. In some embodiments, the mold monitoring app 1320 includes a user interface that presents the status of the robot and mold-related conditions in the building.

In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video, or other such information presentation.

Figure 13:
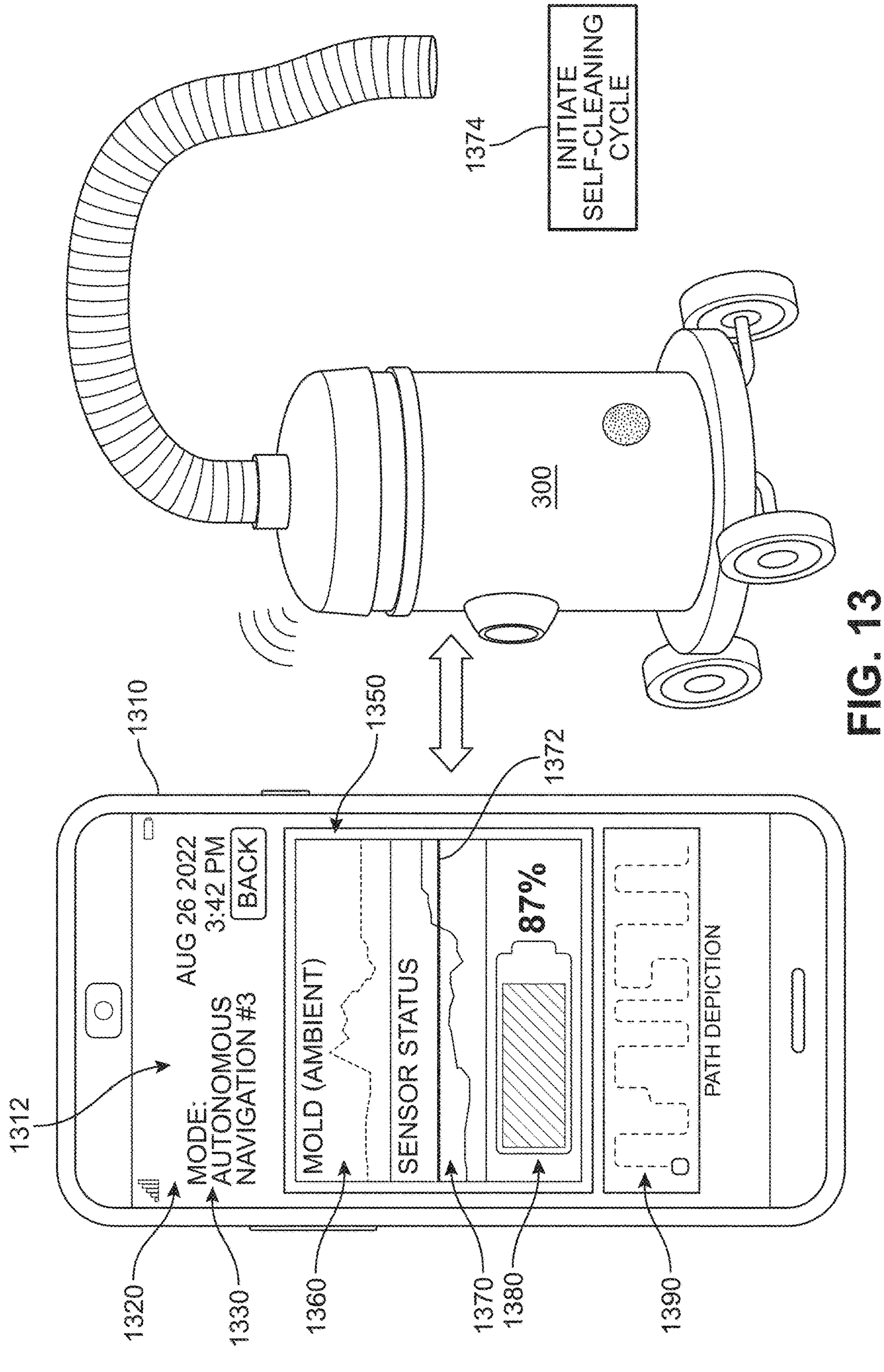
FIG. 13 is a depiction of an app for monitoring data collected by the mold remediation robot assembly and the initiation of a self-cleaning cycle, according to an embodiment.

In FIG. 13, an example of the mold monitoring app 1320 is presented on a display 1312 of the mobile phone 1310. In this case, an autonomous navigation mode 1330 is being implemented, such that the assembly 300 can travel and perform its tasks with little to no navigational inputs from a user. In addition, the mold monitoring app 1320 presents a data panel or dashboard 1350 for review by a user. In this example, the dashboard 1350 includes a graphical representation of moisture/mold content 1360 that has been detected by its sensor(s) in real-time, battery level 1380 for the assembly 300, a path depiction 1390 that schematically illustrates the route the assembly 1300 is traveling as it performs its inspection, and a sensor status panel 1370 that can reflect the sensor plate's mold accumulation levels. For example, in FIG. 13, the mold accumulation can be seen to be increasing over time. When the level exceeds a preset threshold 1372, a self-cleaning cycle 1374 is triggered.

Figure 14:
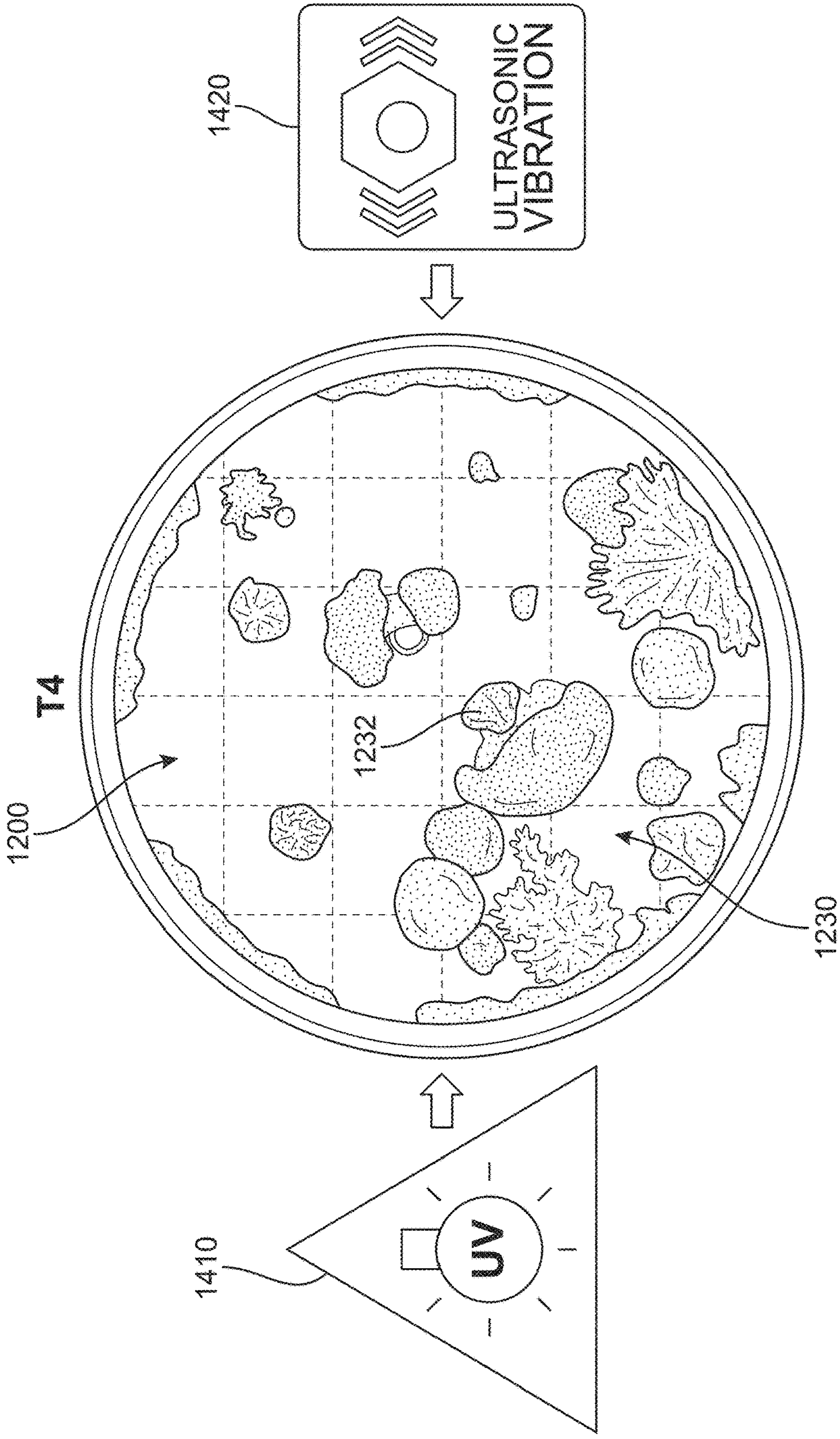
FIG. 14 shows two possible mechanisms by which self-cleaning of the sensor plate can be performed, according to an embodiment.
Figure 15:
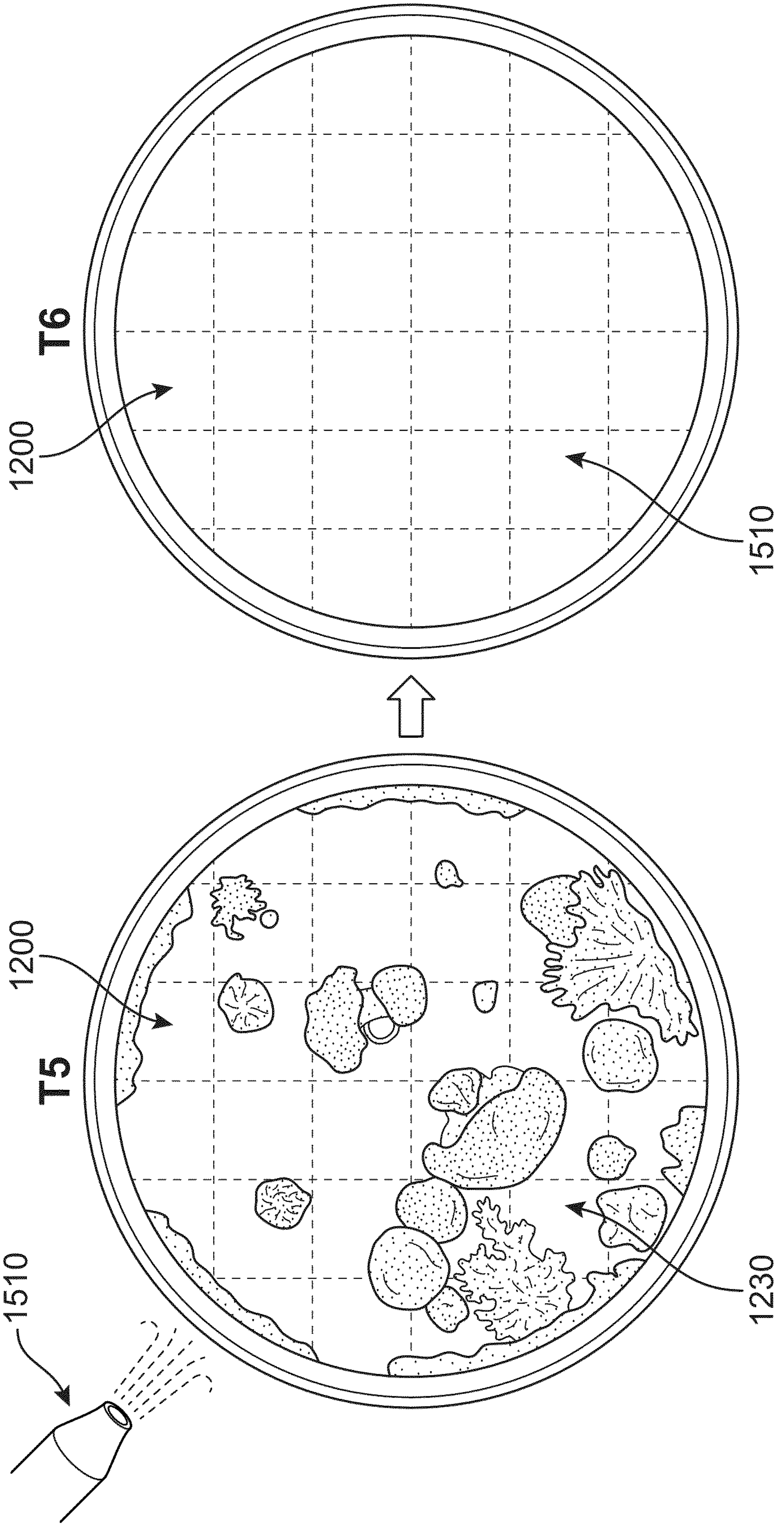
FIG. 15 illustrates the use of an air nozzle to blow mold particles off the sensor plate, according to an embodiment.

Some examples of the mechanisms by which the self-cleaning cycle can be performed are described with reference to FIGS. 14, 15, and 16A-16C. In FIG. 14, a schematic diagram depicts the use of a first mechanism 1410 and a second mechanism 1420 by which the sensor plate 1200 can be cleaned at fourth time T4. In some embodiments, the sensor can be near or within exposure range of a UV light/laser device (first mechanism 1410) that when directed at the sensor plate 1200 can burn mold particles (e.g., particles comprising the second level of mold accumulation 1230) that have become stuck to or otherwise adhere to the sensor surface, blocking its effective sensing area. In different embodiments, once the mold on the sensor has been neutralized/killed, the assembly activates an ultrasonic vibrator device (second mechanism 1420) in contact with the sensor plate. The ultrasonic vibrator device can then rapidly vibrate the sensor and displace the dead mold from the surface of the sensor.

However, it can be appreciated that even with this displacement, particles of now-displaced mold may still linger on the surface of the sensor. In different embodiments, the assembly can employ one or both of two dispersal features, as shown in FIGS. 15 and 16A-16C. In one example, at a fifth time T5 shown in FIG. 15, a first approach is illustrated in which an air nozzle 1510 that is positioned with the nozzle opening directed at the surface of the sensor releases a gust or strong rush of air. In response to this force, the mold particles are blown or pushed off the surface of the sensor plate at a sixth time T6 and out of the distal end of the hose, bringing the sensor plate 1200 to a third level of mold accumulation 1510 that is near zero again and ready to perform mold detection with high sensitivity and accuracy.

Figure 16A:
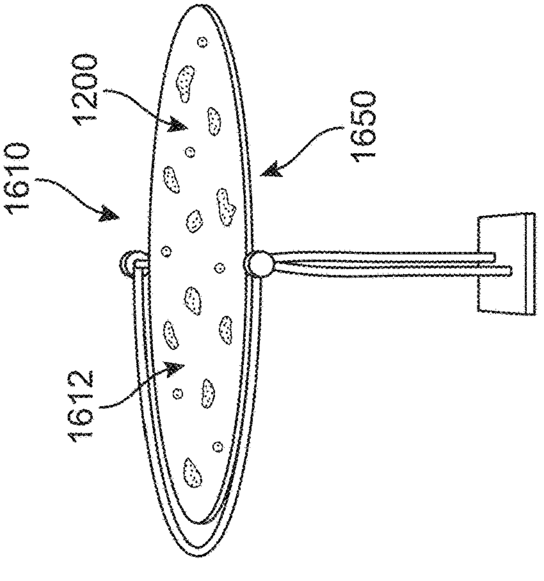
FIGS. 16A, 16B, and 16C show a sequence in which the sensor plate is tilted to cause displaced mold particles to fall of its surface, according to an embodiment.
Figure 16B:
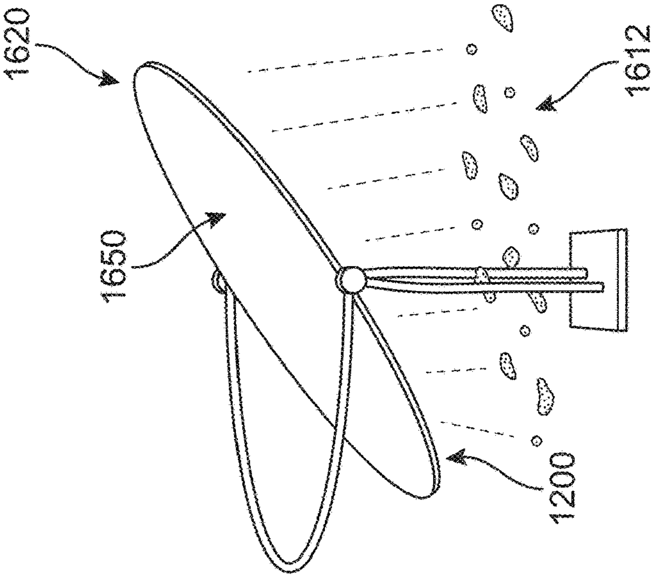
Figure 16C:
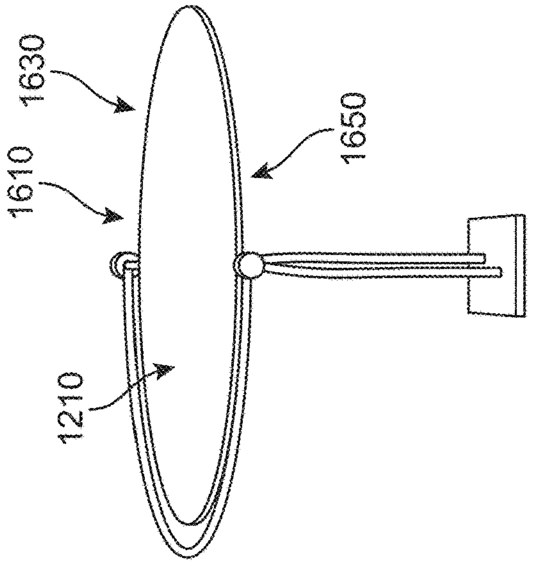
Figure 17:
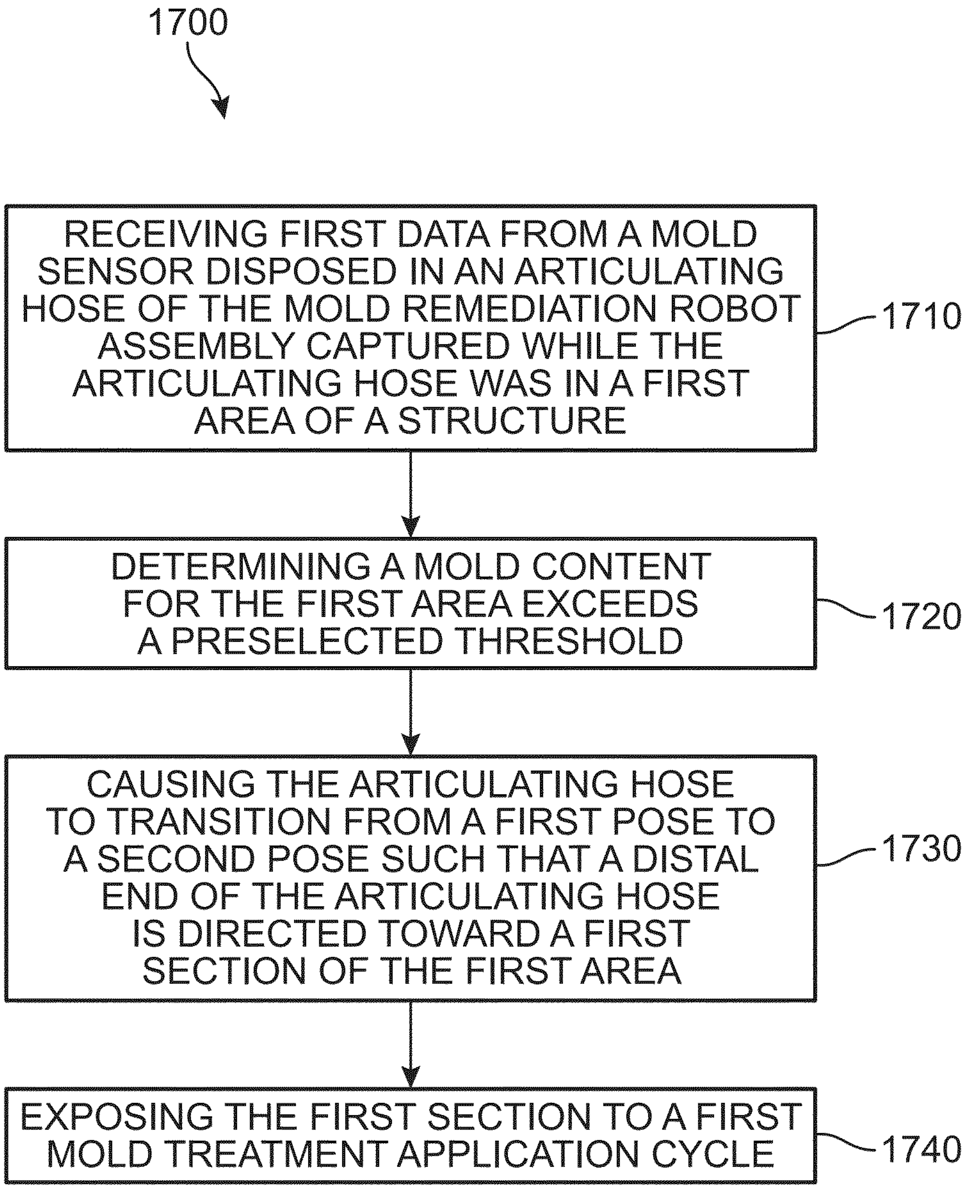
FIG. 17 is a flow chart showing the process by which mold remediation is performed using an articulating hose, according to an embodiment.

An alternate dispersal process is depicted in FIGS. 16A-16C. In this approach, the sensor plate 1200 can be movable or rotatable relative to a stable mounting device 1650. In a first stage 1610 shown in FIG. 16A, the sensor plate 1200 includes displaced mold particles 1612 that continue to block the sensor. At this time, the sensor plate 1200 is in its default horizontal orientation, and a first surface of the plate faces upward while an opposite-side of the plate faces downward. In a second stage 1620 shown in FIG. 16B, the system triggers an automated tilting operation via motors in the mounting device 1650 that causes the sensor plate 1200 to turn relative to a vertical axis and flip over so that the first surface faces toward a downward direction, such that the displaced mold particles 1612 simply fall off the upper surface of the sensor plate 1200 in response to the motion and the force of gravity. Finally, in a third stage 1630, the mounting device 1650 reverses the operation and returns the sensor plate 1200 to its original orientation. The first surface of the sensor plate is now at a fourth level of mold accumulation 1510 that is near zero again and ready to perform mold detection with high sensitivity and accuracy. In some embodiments, these processes can be combined, such that the robot assembly uses both the pressure of air from the air nozzle and the tilt feature to clear the surface of the sensor. The system can then identify that the accumulation has been reduced and automatically end the cleaning cycle. In cases where some of the mold particles remain, the cleaning cycle can be repeated until the system determines that the accumulation has been sufficiently reduced and automatically end the cleaning cycle FIG. 17 is a flow chart illustrating an embodiment of a method 1700 of mold remediation in a structure. The method 1700 includes a first step 1710 of receiving, by an onboard computing system of a mold remediation robot assembly, first data from a mold sensor disposed in an articulating hose of the mold remediation robot assembly, the first data captured while the articulating hose was in a first area of the structure. A second step 1720 includes determining, at the onboard computing system, a mold content for the first area exceeds a preselected threshold, and a third step 1730 includes causing, via the onboard computing system, the articulating hose to transition from a first pose to a second pose in response to determining the mold content for the first area exceeds a preselected threshold such that a distal end of the articulating hose is directed toward a first section of the first area. The method 1700 also includes a fourth step 1740 of exposing the first section to a first mold treatment application cycle.

In other embodiments, the method may include additional steps or aspects. In one embodiment, the first mold treatment application cycle involves directing ultraviolet (UV) light from a UV light source disposed along the distal end at the first section. In another example, the first mold treatment application cycle involves releasing disinfectant spray from the distal end toward the first section. In some embodiments, the articulating hose is in a substantially erect orientation that is aligned with a vertical axis when in first pose. In different embodiments, the articulating hose includes a plurality of segments, a first segment of the plurality of segments includes a first fluid pocket and a second fluid pocket, and each fluid pocket is configured to be either pressurized or evacuated in order to cause the articulating hose to bend at the first segment when transitioning from the first pose to the second pose. In some embodiments, the method also includes transmitting a control signal from the onboard computing device to a positive and negative pressures (PNP) actuation system; and causing, in response to the control signal and via the PNP actuation system, a change in the pressurization of the first fluid pocket, thereby bending the articulating hose toward the first section.

As described herein, some of the proposed embodiments can be understood to include a mold remediation robot assembly. The assembly can include (a) a first device including: an articulating hose, and a mold detection system including a mold sensor configured to measure mold content as air passes through an interior of the articulating hose; and (b) a second device including: a vacuum system including an air cannister, the articulating hose being secured to and in fluid communication with the air cannister, and a mold remediation system including an ultraviolet (UV) light configured to kill mold particles. In some embodiments, the articulating hose includes a plurality of segments, and each segment includes at least two fluid pockets. In one example, a first segment of the plurality of segments includes a first fluid pocket and a second fluid pocket, and each fluid pocket is configured to be either pressurized or evacuated. In another example, the first segment bends in a direction toward the second fluid pocket when the first fluid pocket is pressurized. In some embodiments, the first segment further includes a third fluid pocket, the three fluid pockets are spaced apart evenly from one another, and the first segment bends in a direction between the second fluid pocket and the third fluid pocket when the first fluid pocket is pressurized. In another embodiment, the first segment further includes a third fluid pocket and a fourth fluid pocket, the four fluid pockets are spaced apart evenly from one another, and the first segment bends in a direction toward the third fluid pocket when the first fluid pocket is pressurized. In different embodiments, the mold sensor employs one or more of electrical tomography, gamma-rays, X-rays, and a dielectric and/or microwave meter to detect and estimate mold content. In some embodiments, the assembly also includes an onboard computing system that processes data collected by the mold sensor and determines whether a mold content for an area in a structure exceeds a preselected threshold. In one example, the onboard computing system causes the mold remediation system to automatically expose the area to UV light in response to a determination that mold content in the area exceeds the preselected threshold.

Figure 18:
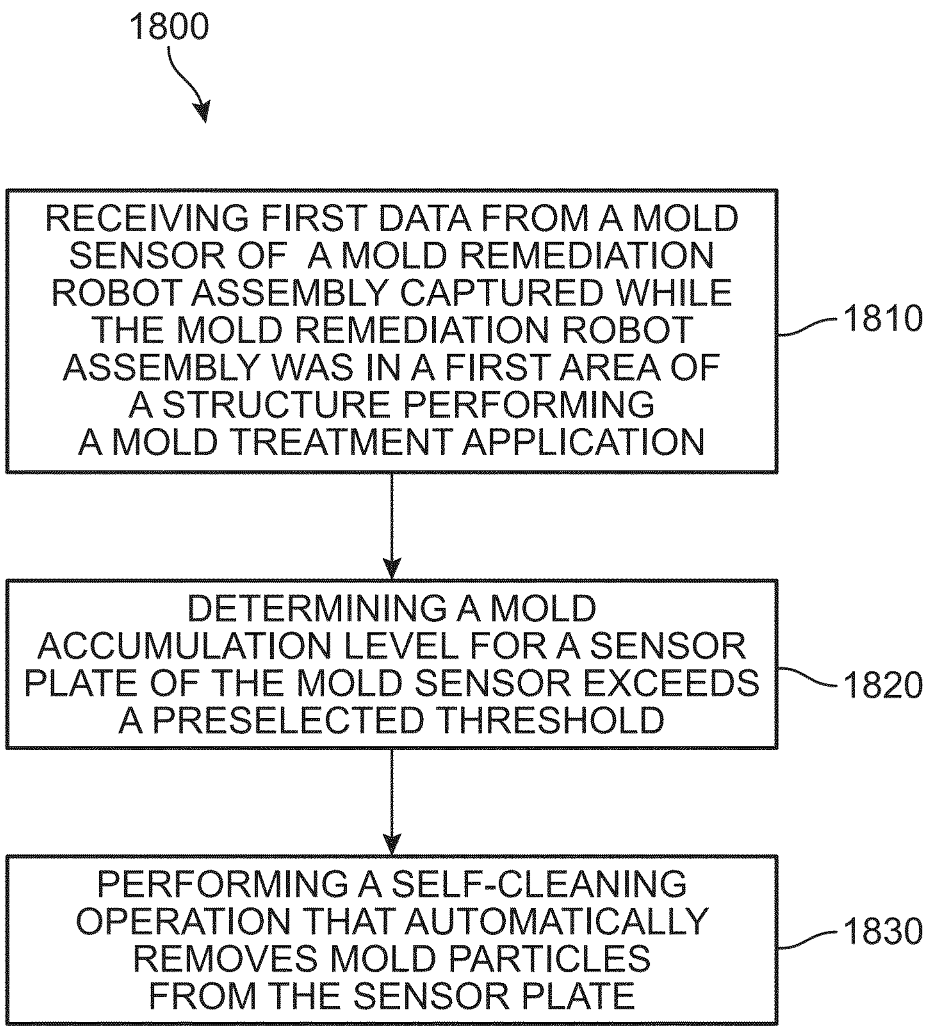
FIG. 18 is a flow chart showing the process by which mold remediation is performed using a self-cleaning system, according to an embodiment.

FIG. 18 is a flow chart illustrating an embodiment of another method 1800 of mold remediation in a structure. The method 1800 includes a first step 1810 of receiving, by an onboard computing system of a mold remediation robot assembly, first data from a mold sensor of the mold remediation robot assembly, the first data captured while the mold remediation robot assembly was in a first area of a structure performing a mold treatment application. A second step 1820 includes determining, at the onboard computing system, a mold accumulation level for a sensor plate of the mold sensor exceeds a preselected threshold. In addition, a third step 1830 includes performing, via the mold remediation robot assembly, a self-cleaning operation that automatically removes mold particles from the sensor plate in response to determining the mold accumulation level exceeds the preselected threshold.

In other embodiments, the method may include additional steps or aspects. In one embodiment, the self-cleaning operation involves exposing the sensor plate to an ultraviolet (UV) light to kill mold particles on the sensor plate. In another example, the self-cleaning operation involves vibrating the sensor plate with an ultrasonic vibrator to displace mold particles on the sensor plate. In some embodiments, the self-cleaning operation involves using an air nozzle to blow mold particles off a surface of the sensor plate. In another example, the self-cleaning operation involves tilting the sensor plate to cause mold particles to fall off a surface of the sensor plate. In some embodiments, the mold treatment application includes exposing the first area to an ultraviolet (UV) light source or releasing disinfectant spray in a direction toward the first area.

As described herein, some of the proposed embodiments can be understood to include another mold remediation robot assembly. The assembly can include (a) an autonomous vehicle; (b) a mold detection system installed on the autonomous vehicle, the mold detection system including: a mold sensor configured to measure mold content, the mold sensor including a sensor plate and a self-cleaning system that automatically removes mold particles from the sensor plate in response to an accumulation level of mold particles on the sensor plate exceeding a preselected threshold. In different embodiments, a mold remediation system is also installed on the autonomous vehicle, the mold remediation system including an ultraviolet (UV) light configured to kill mold particles.

In some embodiments, the assembly also includes an onboard computing system that processes data collected by the mold sensor and determines whether a mold content for an area in a structure exceeds a preselected threshold. In one example, the onboard computing system causes the mold remediation system to automatically expose the area to UV light in response to a determination that mold content in the area exceeds a preselected threshold. In another embodiment, the self-cleaning system employs an ultraviolet (UV) light to kill mold particles on the sensor plate. In different embodiments, the self-cleaning system employs an ultrasonic vibrator to displace mold particles on the sensor plate. In one example, the self-cleaning system employs an air nozzle that blows mold particles off a surface of the sensor plate. In some embodiments, the self-cleaning system employs a mounting device to tilt the sensor plate to cause mold particles to fall off a surface of the sensor plate. In different embodiments, the mold sensor employs one or more of electrical tomography, gamma-rays, X-rays, and a dielectric and/or microwave meter to detect and estimate mold content.

It is appreciated that methods in accordance with the present disclosure can include any combination of the aspects and features described herein. That is, methods and systems in accordance with the present disclosure are not limited to the combinations of aspects and features specifically described herein, but also include any combination of the aspects and features provided.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both. In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device (s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front-end component, e.g., a client computer having a graphical user interface or a web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A mold remediation robot assembly, the assembly comprising:

an autonomous vehicle;

a mold detection system installed on the autonomous vehicle, the mold detection system including:

a mold sensor configured to measure mold content, the mold sensor including a sensor plate; and a self-cleaning system that automatically removes mold particles from the sensor plate in response to an accumulation level of mold particles on the sensor plate exceeding a preselected threshold.

2. The assembly of claim 1, further comprising a mold remediation system installed on the autonomous vehicle, the mold remediation system including an ultraviolet (UV) light configured to kill mold particles.

3. The assembly of claim 1, further including an onboard computing system that processes data collected by the mold sensor and determines whether a mold content for an area in a structure exceeds a preselected threshold.

4. The assembly of claim 2, wherein the onboard computing system causes the mold remediation system to automatically expose the area to UV light in response to a determination that mold content in the area exceeds a preselected threshold.

5. The assembly of claim 1, wherein the self-cleaning system employs an ultraviolet (UV) light to kill mold particles on the sensor plate.

6. The assembly of claim 1, wherein the self-cleaning system employs an ultrasonic vibrator to displace mold particles on the sensor plate.

7. The assembly of claim 1, wherein the self-cleaning system employs an air nozzle that blows mold particles off a surface of the sensor plate.

8. The assembly of claim 1, wherein the self-cleaning system employs a mounting device to tilt the sensor plate to cause mold particles to fall off a surface of the sensor plate.

9. The assembly of claim 1, wherein the mold sensor employs one or more of electrical tomography, gamma-rays, X-rays, and a dielectric and/or microwave meter to detect and estimate mold content.

10. A method of mold remediation, the method comprising:

receiving, by an onboard computing system of a mold remediation robot assembly, first data from a mold sensor of the mold remediation robot assembly, the first data captured while the mold remediation robot assembly was in a first area of a structure performing a mold treatment application;

determining, at the onboard computing system, a mold accumulation level for a sensor plate of the mold sensor exceeds a preselected threshold; and performing, via the mold remediation robot assembly, a self-cleaning operation that automatically removes mold particles from the sensor plate in response to determining the mold accumulation level exceeds the preselected threshold.

11. The method of claim 10, wherein the self-cleaning operation involves exposing the sensor plate to an ultraviolet (UV) light to kill mold particles on the sensor plate.

12. The method of claim 10, wherein the self-cleaning operation involves vibrating the sensor plate with an ultrasonic vibrator to displace mold particles on the sensor plate.

13. The method of claim 10, wherein the self-cleaning operation involves using an air nozzle to blow mold particles off a surface of the sensor plate.

14. The method of claim 10, wherein the self-cleaning operation involves tilting the sensor plate to cause mold particles to fall off a surface of the sensor plate.

15. The method of claim 10, wherein the mold treatment application includes exposing the first area to an ultraviolet (UV) light source or releasing disinfectant spray in a direction toward the first area.

16. A system for mold remediation, the system comprising a processor and machine-readable media including instructions which, when executed by the processor, cause the processor to:

receive, by an onboard computing system of a mold remediation robot assembly, first data from a mold sensor of the mold remediation robot assembly, the first data captured while the mold remediation robot assembly was in a first area of a structure performing a mold treatment application;

determine, at the onboard computing system, a mold accumulation level for a sensor plate of the mold sensor exceeds a preselected threshold; and perform, via the mold remediation robot assembly, a self-cleaning operation that automatically removes mold particles from the sensor plate in response to determining the mold accumulation level exceeds the preselected threshold.

17. The system of claim 16, wherein the self-cleaning operation involves exposing the sensor plate to an ultraviolet (UV) light to kill mold particles on the sensor plate.

18. The system of claim 16, wherein the self-cleaning operation involves vibrating the sensor plate with an ultrasonic vibrator to displace mold particles on the sensor plate.

19. The system of claim 16, wherein the self-cleaning operation involves using an air nozzle to blow mold particles off a surface of the sensor plate.

20. The system of claim 16, wherein the self-cleaning operation involves tilting the sensor plate to cause mold particles to fall off a surface of the sensor plate.

* * * * *